US012327155B2

(12) United States Patent
Omori et al.

(10) Patent No.: US 12,327,155 B2
(45) Date of Patent: *Jun. 10, 2025

(54) CONTAINER PROVIDED WITH RFID MODULE AND METHOD FOR MANUFACTURING CONTAINER PROVIDED WITH RFID MODULE

(71) Applicant: Murata Manufacturing Co., Ltd., Nagaokakyo (JP)

(72) Inventors: Ryohei Omori, Nagaokakyo (JP); Noboru Kato, Nagaokakyo (JP); Hirokazu Yazaki, Nagaokakyo (JP); Mikiko Saito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 150 days.

This patent is subject to a terminal disclaimer.

(21) Appl. No.: 18/301,592

(22) Filed: Apr. 17, 2023

(65) Prior Publication Data

US 2023/0259735 A1    Aug. 17, 2023

Related U.S. Application Data

(63) Continuation of application No. PCT/JP2021/042274, filed on Nov. 17, 2021.

(30) Foreign Application Priority Data

Nov. 30, 2020 (JP) ................................ 2020-198748
May 13, 2021 (JP) ................................ 2021-081611
Jun. 25, 2021 (JP) ................................ 2021-105801

(51) Int. Cl.
*G06K 19/077* (2006.01)
(52) U.S. Cl.
CPC ... *G06K 19/07779* (2013.01); *G06K 19/0772* (2013.01)

(58) Field of Classification Search
CPC .. H01Q 1/22; H01Q 9/04; H01Q 9/02; G06K 19/07779; G06K 19/07749; G06K 19/0775; G06K 19/07794
See application file for complete search history.

(56) References Cited

U.S. PATENT DOCUMENTS

| 8,666,090 B1 * | 3/2014 | Townsend ............... H04R 3/005 381/92 |
| 2009/0027210 A1 * | 1/2009 | Sakama ............ G06K 19/07756 340/572.7 |

(Continued)

FOREIGN PATENT DOCUMENTS

| EP | 2428457 A1 | 3/2012 |
| JP | 2002049905 A | 2/2002 |

(Continued)

OTHER PUBLICATIONS

International Search Report issued for PCT/JP2021/042274, mailed Jan. 25, 2022, 3 pages.

*Primary Examiner* — Mirza F Alam
(74) *Attorney, Agent, or Firm* — ArentFox Schiff LLP

(57) ABSTRACT

A container including an RFID module is provided that includes a base, and an antenna pattern. The antenna pattern includes a first antenna film and a second antenna film on a first main surface of the base. The RFID module includes an RFIC element, a filter circuit, and first and second electrodes. The filter circuit is configured to transmit a current due to an electromagnetic wave at a natural resonance frequency to the RFIC element. The first and second electrodes are connected to the filter circuit. The first electrode of the RFID module and the first antenna film are electrically connected to each other. The second electrode of the RFID module and the second antenna film are electrically con- (Continued)

nected to each other. Moreover, a sheet resistance of each of the first antenna film and the second antenna film is 0.5Ω/sq or more.

20 Claims, 27 Drawing Sheets

(56) References Cited

U.S. PATENT DOCUMENTS

| | | | |
|---|---|---|---|
| 2010/0090832 A1 | 4/2010 | Bozet et al. | |
| 2010/0219252 A1* | 9/2010 | Kikuchi | H01Q 15/00 |
| | | | 235/488 |
| 2012/0086526 A1 | 4/2012 | Kato | |
| 2014/0291390 A1* | 10/2014 | Kawase | H01Q 1/2225 |
| | | | 235/375 |
| 2017/0154197 A1* | 6/2017 | Lai | G06K 19/07372 |
| 2021/0313693 A1 | 10/2021 | Kato | |

FOREIGN PATENT DOCUMENTS

| | | |
|---|---|---|
| JP | 2002259934 A | 9/2002 |
| WO | 2010146944 A1 | 12/2010 |
| WO | 2019039484 A1 | 2/2019 |
| WO | 2020137060 A1 | 7/2020 |

\* cited by examiner

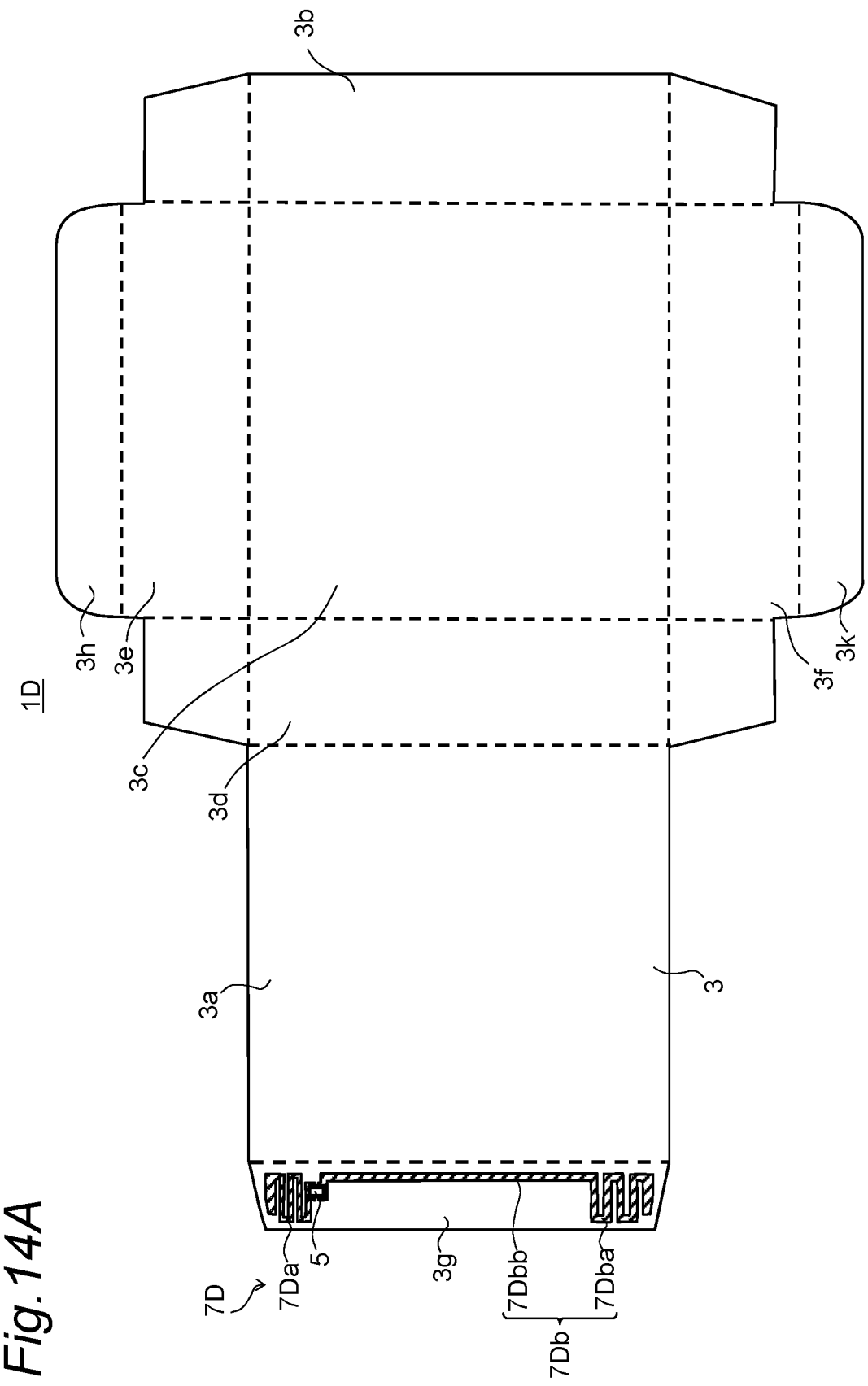

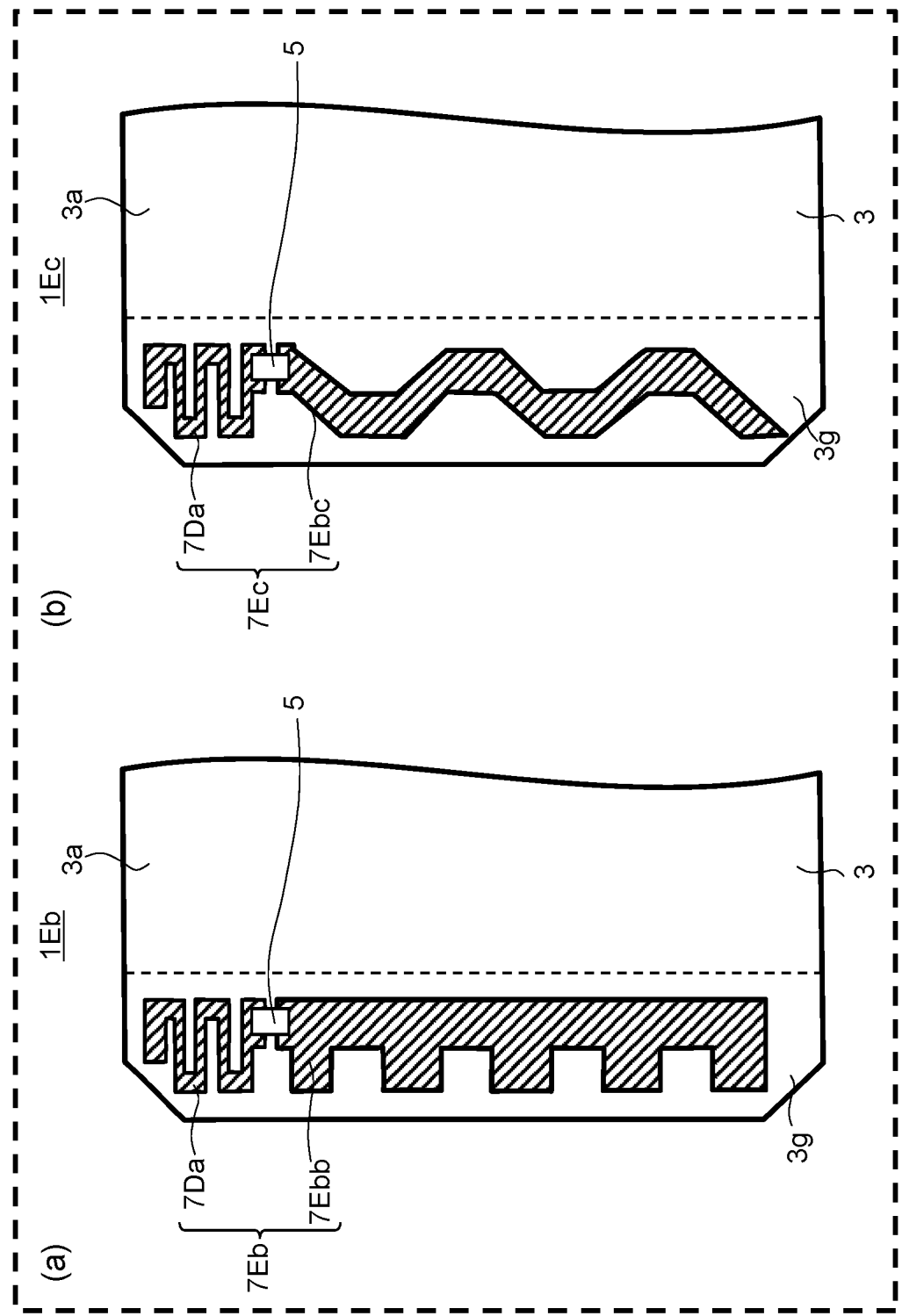

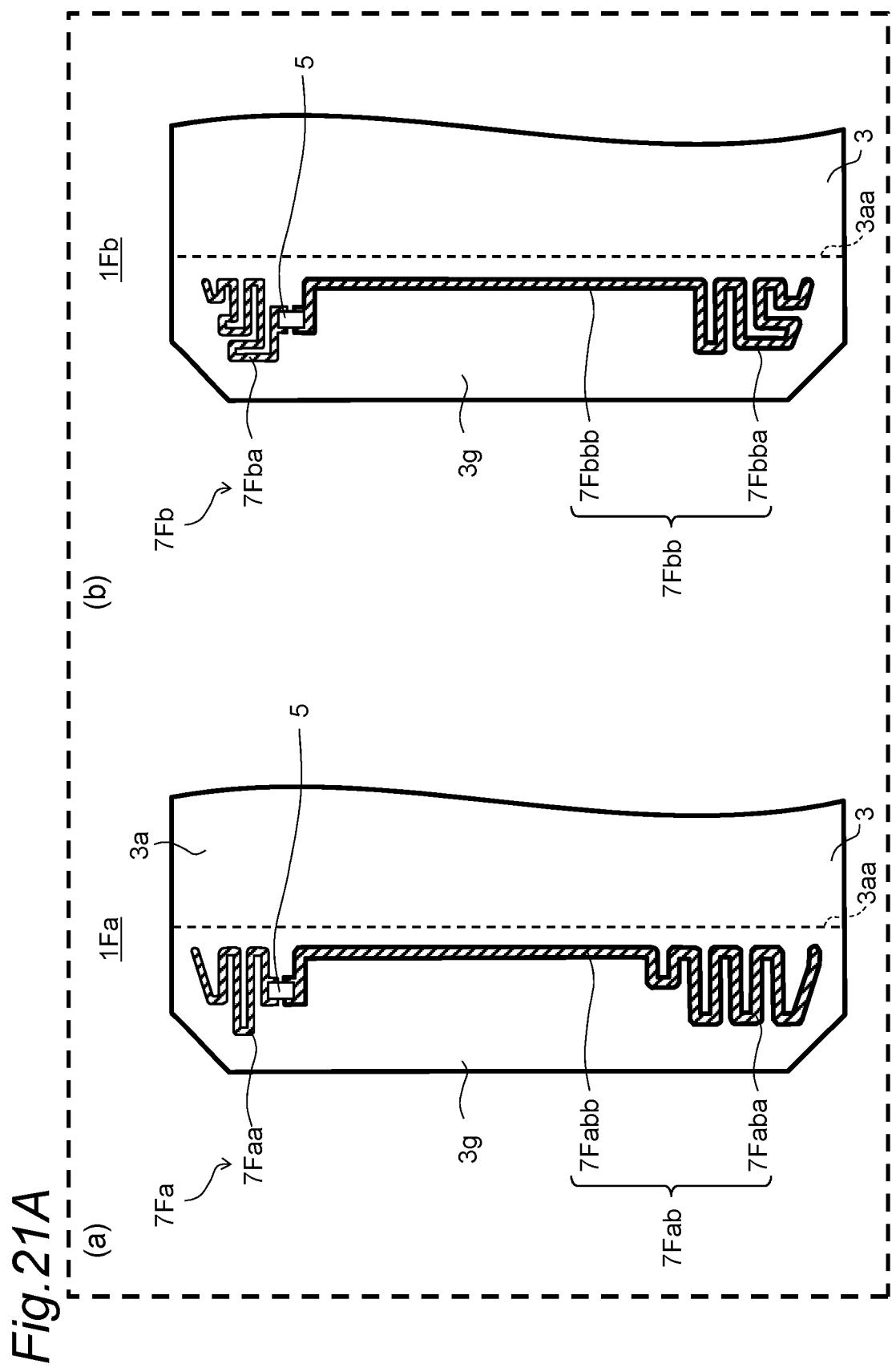

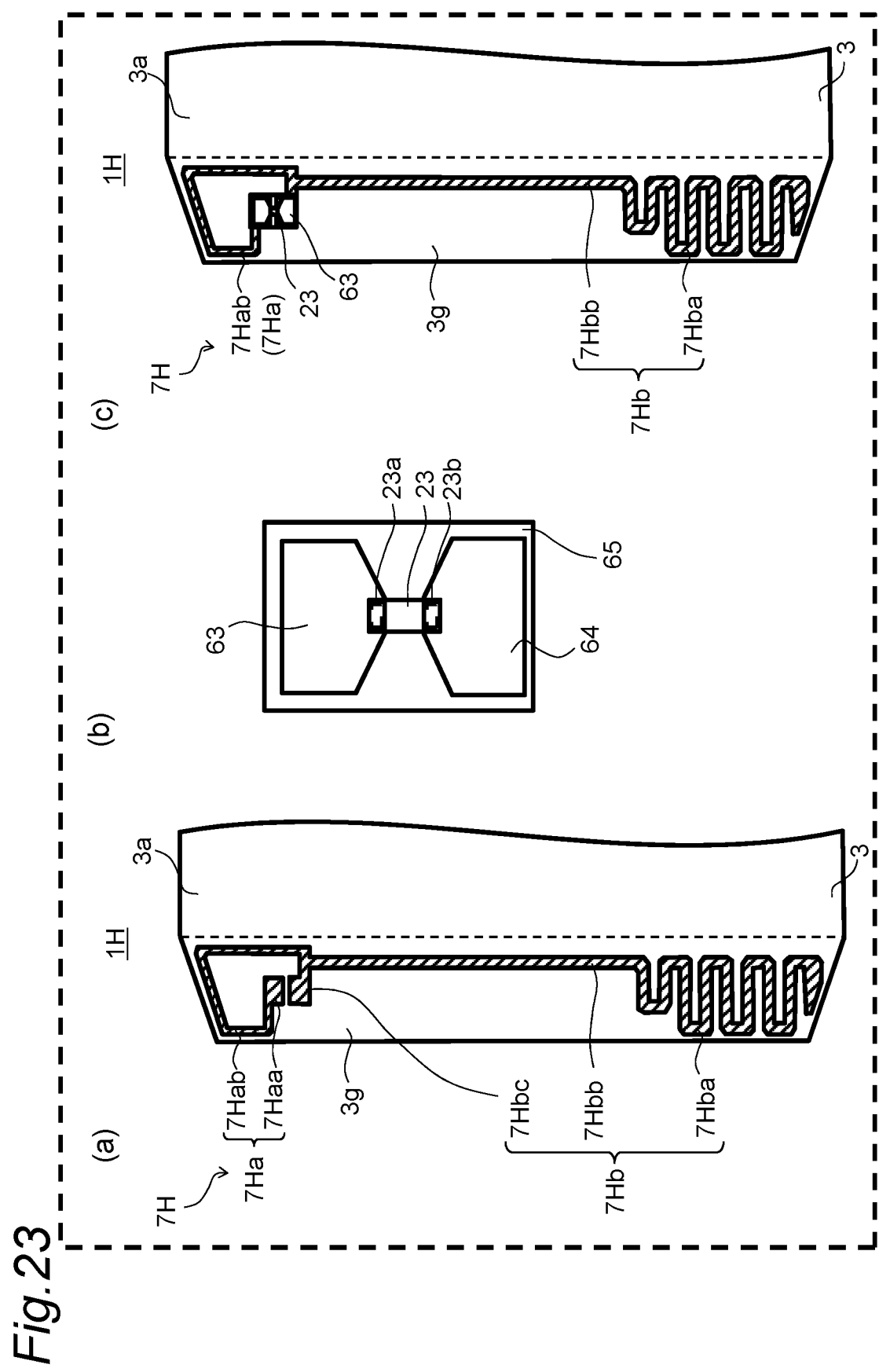

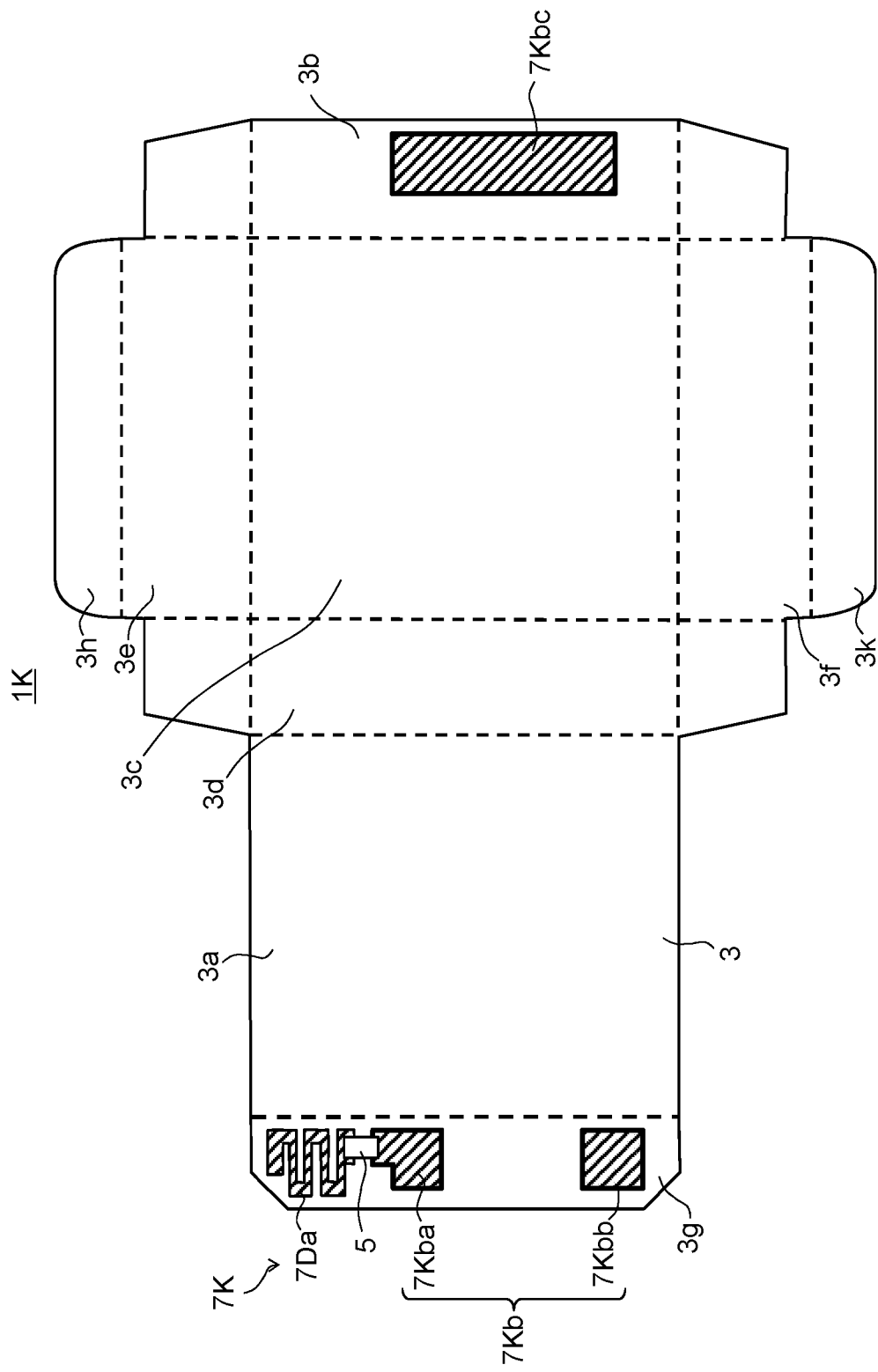

CONTAINER PROVIDED WITH RFID MODULE AND METHOD FOR MANUFACTURING CONTAINER PROVIDED WITH RFID MODULE

CROSS REFERENCE TO RELATED APPLICATIONS

This application is a continuation of PCT Application No. PCT/JP2021/042274, filed Nov. 17, 2021, which claims priority to Japanese Patent Application No. 2020-198748, filed Nov. 30, 2020, Japanese Patent Application No. 2021-081611, filed May 13, 2021, and Japanese Patent Application No. 2021-105801, filed Jun. 25, 2021, the entire contents of each of which are hereby incorporated by reference in their entirety.

TECHNICAL FIELD

The present invention relates to a container including an RFID module, and more particularly, to a container including an RFID module and a method for manufacturing the container including an RFID module using a radio frequency identification (RFID) technology that performs data communication in a non-contact manner by an induction field or a radio wave.

BACKGROUND

Conventionally, it has been considered to manage products in a container by attaching an RFID tag that functions as a wireless communication device to the container. In the RFID tag, a metal material, such as an antenna pattern, is formed on an insulating substrate, such as a paper material or a resin material, together with a radio-frequency integrated circuit (RFIC). However, when a metal film is formed on the outer surface of the container, the RFID tag is affected and communication cannot be performed.

WO2019/039484 (hereinafter "Patent Document 1") proposes a configuration in which an RFID tag that can support a metal formed in a part of a container is attached. The package disclosed in Patent Document 1 assigns metallic luster to the package main body by printing a metal layer on the package main body using ink containing metal particles. In addition, there is a region where no metal layer is formed in a part of the package main body, and an RFID tag is attached to this region.

However, in Patent Document 1, a space is required for attaching an RFID tag in which an RFIC chip and an antenna pattern are integrated on an outer surface of a container. Therefore, when a pattern is formed in an attachment space of the RFID tag, the pattern has to be printed again on the RFID tag.

SUMMARY OF THE INVENTION

Therefore, it is an object of the present invention to provide a container including an RFID module that suppresses reduction in designability and improves manufacturing efficiency, and also to provide a method for manufacturing the container including an RFID module.

In an exemplary aspect, a container including an RFID module is provided in which the container includes an insulating base forming an outer shape of the container and an antenna pattern including a first antenna film and a second antenna film on a first main surface of the base material. The RFID module includes an RFIC element, a filter circuit configured to transmit a current due to an electromagnetic wave at a natural resonance frequency being a communication frequency to the RFIC element, and first and second electrodes to be connected to the filter circuit. The first electrode of the RFID module and the first antenna film are electrically connected to each other, and the second electrode of the RFID module and the second antenna film are electrically connected to each other. A sheet resistance of each of the first antenna film and the second antenna film is $0.5\Omega/\mathrm{sq}$ or more.

Moreover, in an exemplary aspect, a method for manufacturing a container is provided that includes printing an antenna pattern, including a first antenna film and a second antenna film, on a first main surface of a base material forming an outer shape of a container and having an insulating property; and mounting an RFID module that includes an RFIC element, a filter circuit configured to transmit a current due to an electromagnetic wave at a natural resonance frequency being a communication frequency to the RFIC element, and first and second electrodes to be connected to the filter circuit on the first antenna film and the second antenna film so as to electrically connect the first electrode and the first antenna film and to electrically connect the second electrode and the second antenna film. In this aspect, a sheet resistance of each of the first antenna film and the second antenna film is $0.5\Omega/\mathrm{sq}$ or more.

According to the exemplary aspects of the present invention, a container including an RFID module is provided that suppresses reduction in designability and improves manufacturing efficiency. Moreover, a method for manufacturing the container including an RFID module is also provided according to an exemplary aspect.

BRIEF DESCRIPTION OF THE DRAWINGS

FIG. 5 shows a plan view of a conductor pattern formed on a substrate of the RFID module, in which FIG. 5*a* is a plan view of a conductor pattern formed on an upper surface of the substrate of the RFID module, and FIG. 5*b* is a perspective plan view of a conductor pattern formed on a lower surface of the substrate as viewed from above.

FIG. 14A is a developed view of a container in a modification of the exemplary embodiment.

FIG. 20A is a partially enlarged view of a developed view of a container in a modification of the exemplary embodiment.

FIG. 21A is a partially enlarged view of a developed view of a container in a modification of the exemplary embodiment.

FIG. 23 is a partially enlarged view of a developed view of a container in a modification of the exemplary embodiment.

FIG. 24A is a developed view of a container in a modification of the exemplary embodiment.

DETAILED DESCRIPTION

Figure 1:
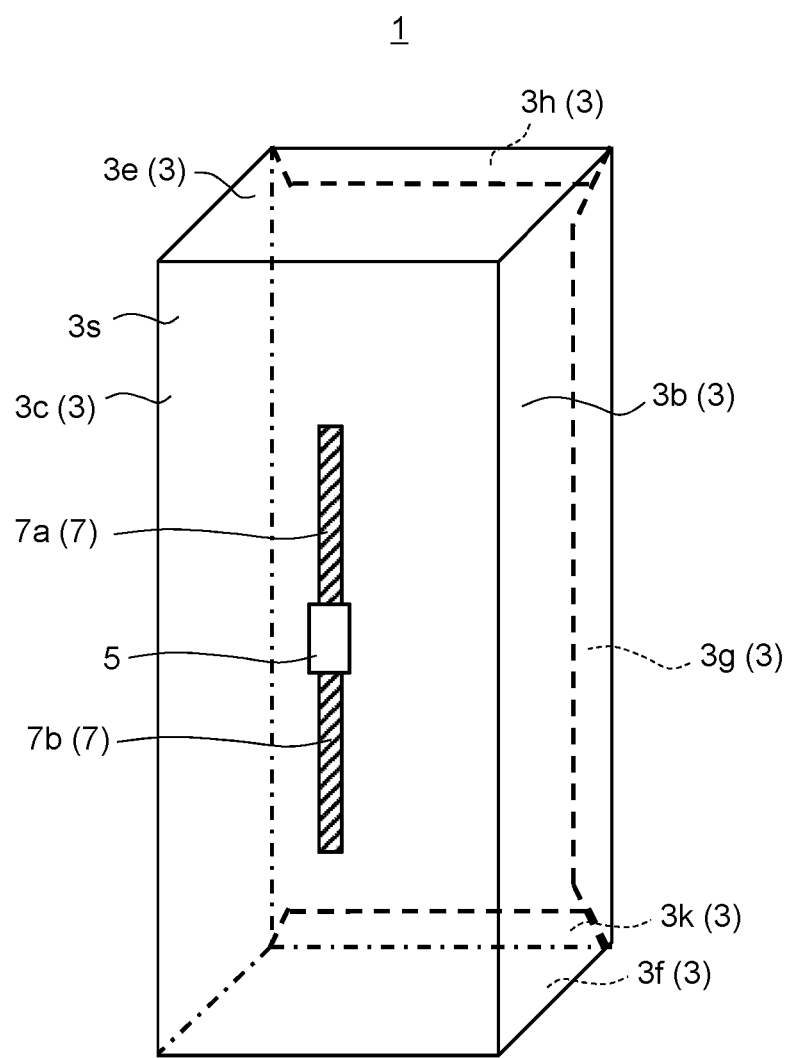
FIG. 1 is an overall perspective view of a container including an RFID module of an exemplary embodiment.

A container of an exemplary aspect includes an RFID module, and further includes an insulating base that defines an outer shape of the container and an antenna pattern including a first antenna film and a second antenna film on a first main surface of the base. The RFID module includes an RFIC element, a filter circuit configured to transmit a current due to an electromagnetic wave at a natural resonance frequency being a communication frequency to the RFIC element, and first and second electrodes to be connected to the filter circuit. The first electrode of the RFID module and the first antenna film are electrically connected to each other, and the second electrode of the RFID module and the second antenna film are electrically connected to each other. A sheet resistance of each of the first antenna film and the second antenna film is 0.5Ω/sq or more.

In the container of the exemplary aspect, since a pattern can be formed using an antenna pattern on the base of the container, the RFID module can be attached to the container while maintaining the degree of freedom of designability in the container. In addition, since the RFID module includes a filter circuit, power can be supplied to the RFIC using the eddy current generated in the antenna pattern.

In an exemplary aspect, the filter circuit may be an LC parallel resonance circuit. Accordingly, a current at a frequency matching the RFIC can be flowed through the RFIC.

In an exemplary aspect, the filter circuit may include a coil formed on a substrate, and the coil may be covered with a protective layer. Accordingly, the dielectric constant of the coil can be fixed, which can be prevented from being affected by the dielectric in the container.

In an exemplary aspect, the coil of the filter circuit may have a figure-eight shape. Accordingly, the magnetic field of the coil can be made less likely to leak to the outside, and the inductance value of the coil can be made less likely to change due to an external factor.

In an exemplary aspect, the first antenna film and the second antenna film may have a thickness of 0.1 μm or more and 3 μm or less. Even with this configuration, since the RFID module includes the filter circuit, it can be flowed through the RFIC using the eddy current generated in the first antenna film and the second antenna film.

In an exemplary aspect, the antenna pattern may be a part of a pattern formed on the base material. By forming a part of the pattern formed on the base material as an antenna pattern, flexibility in designability of the container can be maintained.

Moreover, a printed film may be formed on the antenna pattern. Accordingly, the outer surface of the container can be designed differently from the antenna pattern.

In an exemplary aspect, the container including an RFID module may be an assembled box.

In an exemplary aspect, the base material may have a first surface and a second surface each of which has a first main surface serving as a side surface of the box, and a flap continuous with the first surface for connecting the first surface and the second surface by an adhesive layer. The antenna pattern may be formed on the flap. Moreover, the RFID module may be disposed on the flap.

In an exemplary aspect, the container may house inside a metal article or an article containing moisture. Since a change in dielectric constant due to a metal article or an article containing moisture is reduced, communication can be performed.

In an exemplary aspect, the container may house inside a metal article or an article containing moisture. A space may be formed above the metal article or the article containing moisture in the container. In a side view, the first antenna film may be disposed to overlap the space, and the second antenna film may be disposed to overlap the metal article or the article containing moisture.

Moreover, in an exemplary aspect, a method for manufacturing a container is provided that includes printing an antenna pattern including a first antenna film and a second antenna film on a first main surface of a base material forming an outer shape of a container and having an insulating property; and mounting an RFID module that includes an RFIC element, a filter circuit configured to transmit a current due to an electromagnetic wave at a natural resonance frequency being a communication frequency to the RFIC element, and first and second electrodes to be connected to the filter circuit on the first antenna film and the second antenna film so as to electrically connect the first electrode and the first antenna film and to electrically connect the second electrode and the second antenna film. A sheet resistance of each of the first antenna film and the second antenna film is 0.5Ω/sq or more.

According to an exemplary aspect of the method for manufacturing the container, since a pattern can be formed using an antenna pattern formed on the base material of the container, the RFID module can be attached to the container while the reduction in the degree of freedom of designability suppressed in the container. In addition, since the RFID module includes a filter circuit, it is possible to supply power to the RFIC using the eddy current generated in the antenna pattern.

In addition, a pattern may be printed on the first main surface of the base material. Accordingly, the antenna pattern can be formed as a part of a pattern, and the degree of freedom of designability can be maintained.

The method may further include performing, on the first main surface of the base material, printing of the antenna pattern and printing of the pattern in a same printing step. Since the first antenna film and the second antenna film of the antenna pattern can be formed continuously with the printing on the base material of the container, the manufacturing efficiency of the printing of the pattern of the container 1 and the formation of the antenna pattern can be improved.

In an exemplary aspect, the antenna pattern may be printed on the first main surface by gravure printing or offset printing. Accordingly, the antenna pattern can be formed at high speed.

In general, it should be noted that each of the embodiments described below shows a specific example of the present invention, and the present invention is not limited to this configuration. In addition, numerical values, shapes, configurations, steps, order of steps, and the like specifically shown in the following embodiments show examples, and do not limit the present invention. Among the constituent elements in the following embodiments, constituent elements that are not described in independent claims indicating the highest concept are described as optional constituent elements. In addition, in all the embodiments, the configurations in the respective modifications are the same, and the configurations described in the respective modifications may be combined.

When the relative dielectric constant $\varepsilon r > 1$, the electrical lengths of the antenna pattern and the conductor pattern become longer than the physical length. In the present specification, the electrical length is a length in consideration of shortening or extension of a wavelength due to a relative dielectric constant or a parasitic reactance component.

Exemplary Embodiment

Figure 2:
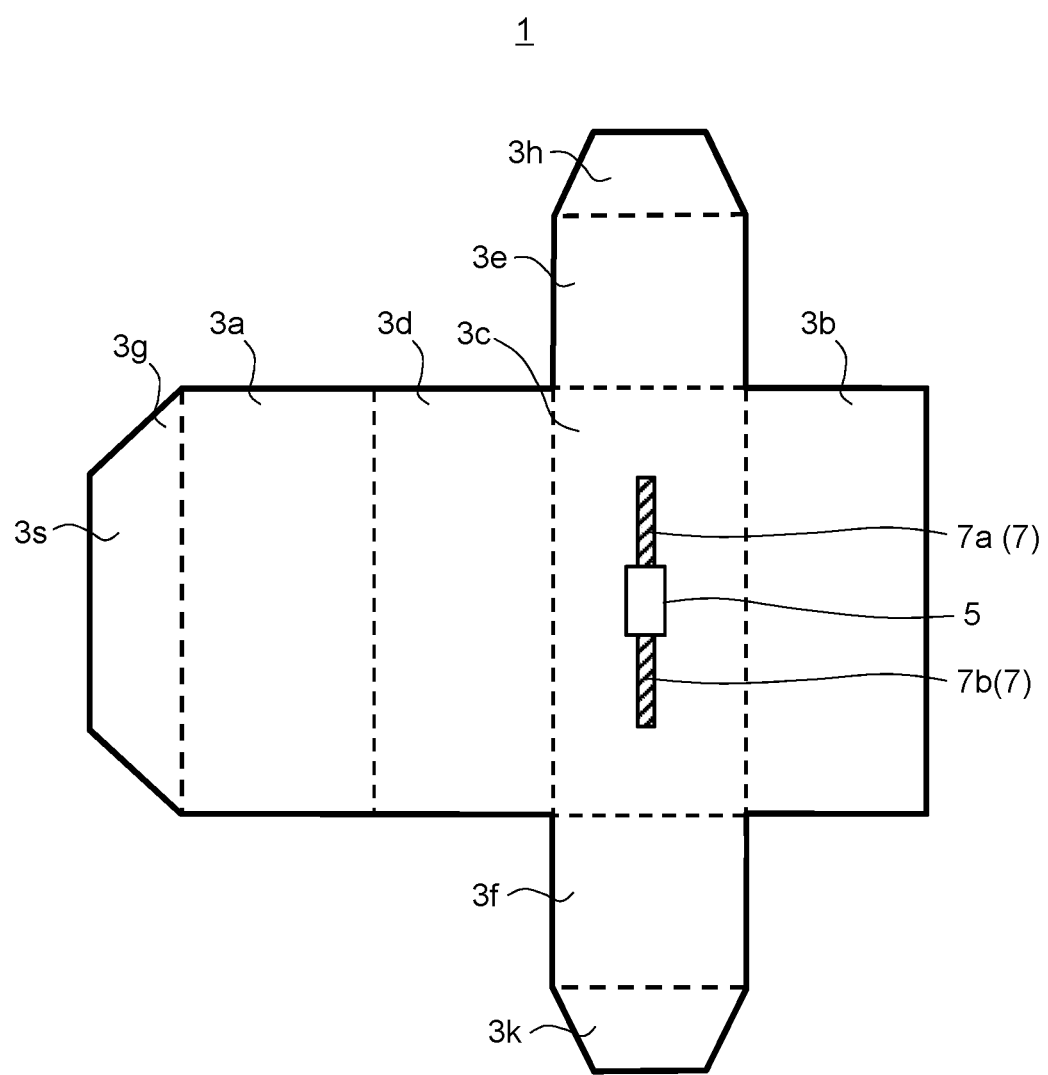
FIG. 2 is a developed view of the container in FIG. 1.

Next, a schematic configuration of a container 1 including an RFID module 5 according to the present invention will be described. FIG. 1 is an overall perspective view of a container 1 including an RFID module 5 according to an exemplary embodiment. FIG. 2 is a developed view of the container 1 in FIG. 1.

The container 1 of the present embodiment includes a base material 3 (also referred to as a "base"), an antenna pattern 7 formed on a first main surface 3s of the base material 3, and an RFID module 5 attached to the antenna pattern 7.

The container 1 is an assembled box formed into a three-dimensional shape by assembling a planar base material 3 as shown in FIG. 2, for example. The container 1 has, for example, a rectangular parallelepiped shape, and the base material 3 is made of, for example, paper, resin, or plastic.

As further shown, the base material 3 includes a first surface 3a, a second surface 3b, a third surface 3c, a fourth surface 3d, a fifth surface 3e, a sixth surface 3f, a first flap 3g, a second flap 3h, and a third flap 3k. For example, the first surface 3a to the fourth surface 3d are side surfaces when assembled, the fifth surface 3e is an upper surface when assembled, and the sixth surface 3f is a lower surface when assembled. The first main surface 3s of the base material 3 is a surface to be an outer surface (e.g., front surface) of the container 1, and the second main surface 3t of the base material 3 is a surface to be an inner surface (e.g., back surface) of the container 1.

The first main surface 3s of the first flap 3g is attached to the second main surface 3t of the second surface 3b through the adhesive layer (not shown) when assembled. The first main surface 3s of the second flap 3h is attached to the second main surface 3t of the first surface 3a through the adhesive layer when assembled. Moreover, the first main surface 3s of the third flap 3k is attached to the second main surface 3t of the first surface 3a through the adhesive layer when assembled.

In an exemplary aspect, the RFID module 5 is a wireless communication device configured to perform wireless communication (e.g., transmission and/or reception) using a high-frequency signal at a communication frequency (e.g., a carrier frequency). The RFID module 5 is configured to wirelessly communicate using a high-frequency signal at a frequency for communication in the UHF band, for example. Here, the UHF band is a frequency band of 860 MHz to 960 MHz.

The antenna pattern 7 is formed on the first main surface 3s of the base material 3. The antenna pattern 7 includes a first antenna film 7a and a second antenna film 7b. A gap 9 is formed between the first antenna film 7a and the second antenna film 7b. In an exemplary aspect, the antenna pattern 7 can be made of a film body of a conductive material, such as carbon base such as graphite, tin, or zinc, base by printing. As the antenna pattern 7, the thickness of the antenna pattern 7 is, for example, about 0.1 μm to 3 μm.

The sheet resistance of the antenna pattern 7 of the embodiment is larger than the sheet resistance of the antenna pattern of the conventional dipole antenna. When the sheet resistance of the antenna pattern 7 is large, the following problems that have not occurred in the conventional dipole antenna occur.

In the conventional dipole antenna, a resonance phenomenon occurs in the entire antenna pattern 7 as an antenna electrode, and an electromagnetic wave is radiated. The antenna pattern 7 of the conventional dipole antenna is formed of a metal foil such as aluminum, and has a thickness of, for example, more than 5 μm and 40 μm or less, and a sheet resistance of the antenna pattern 7 is 0.05Ω/□ or less.

When an aluminum metal foil or the like as the antenna pattern 7 is used, even when the thickness of the metal foil is, for example, 5 μm, if printing is performed on the metal pattern by decorative printing, or gravure printing or offset printing as a design, the printing thickness of the gravure printing is about 0.5 μm to 3 μm, so that print misalignment (e.g., blurring or bleeding) occurs due to a large step due to the thickness of the metal film as the antenna foil. Accordingly, conventionally, it has not been possible to directly print as a design on a container to which an antenna pattern using a metal foil is attached.

Since the metal film is formed by a printing method as the antenna pattern 7 that is printed by gravure printing, offset printing, or the like, as in the exemplary aspects, the thickness of the metal film is about 0.1 μm to 3 μm. With this thickness, gravure printing can be performed on the print electrode of the antenna pattern 7, and for example, printing can be performed so as to hide the antenna pattern 7 with white ink, and the designability is improved. However, when the first antenna film 7a and the second antenna film 7b have this level of thickness, the printed antenna pattern 7 has a small film thickness, and therefore has a large sheet resistance, for example, about 0.5Ω/sq to 50Ω/sq.

However, when the sheet resistance of the metal film increases, even when a series resonance phenomenon in which a standing wave is generated in the entire antenna electrode by the metal film occurs, the radiation power becomes almost heat due to the resistance of the metal film, so that electromagnetic wave radiation cannot be performed as an antenna.

In addition, since the resistance value of the matching circuit unit between the RFIC and the antenna also becomes the same thickness as the metal film, the resistance value of the matching circuit unit increases, the matching loss increases, and the RFID module does not operate.

As described above, the antenna pattern (e.g., an antenna electrode) made of a metal film having a thin film thickness cannot generate electromagnetic wave radiation due to a (series) resonance phenomenon, but when the metal film receives an electromagnetic wave, a current flows through the metal film so as to cancel the electromagnetic wave, and the electromagnetic wave is shielded. This current is also referred to as eddy current. The current component flowing through the metal film due to the eddy current is not caused by the resonance phenomenon of the antenna electrode, and thus can support all frequency components regardless of the electrode pattern shape. This eddy current is known as an effect of metal shielding, but is not usually used as an antenna.

As described below, since the RFID module 5 includes a parallel resonance circuit RC1 as a filter circuit that transmits only a current at a natural resonance frequency to the RFIC 23, an eddy current is selected in frequency, and a current flows through the RFIC 23 to transmit energy. Only a specific frequency is selected between the antenna pattern 7 as an antenna electrode and the RFID module 5, impedance matching is performed, and energy transmission between the RFIC 23 and the antenna pattern 7 is enabled. In this manner, it is considered that communication with the RFIC 23 is enabled.

Therefore, with the container 1, even when the sheet resistance of the antenna pattern 7 is high, communication is enabled using an eddy current that has not been conventionally used.

In addition, the state in which the sheet resistance of the antenna pattern 7 is high occurs not only by the thickness of the antenna pattern 7, but also by the method for manufacturing the antenna pattern 7. For example, also when the antenna pattern 7 is formed of a conductive paste such as an Ag paste, or a conductive polymer material, the sheet resistance may be 0.5 Ω/sq or more. Even in this case, with the container 1 of the present embodiment, wireless communication can be performed.

Figure 3:
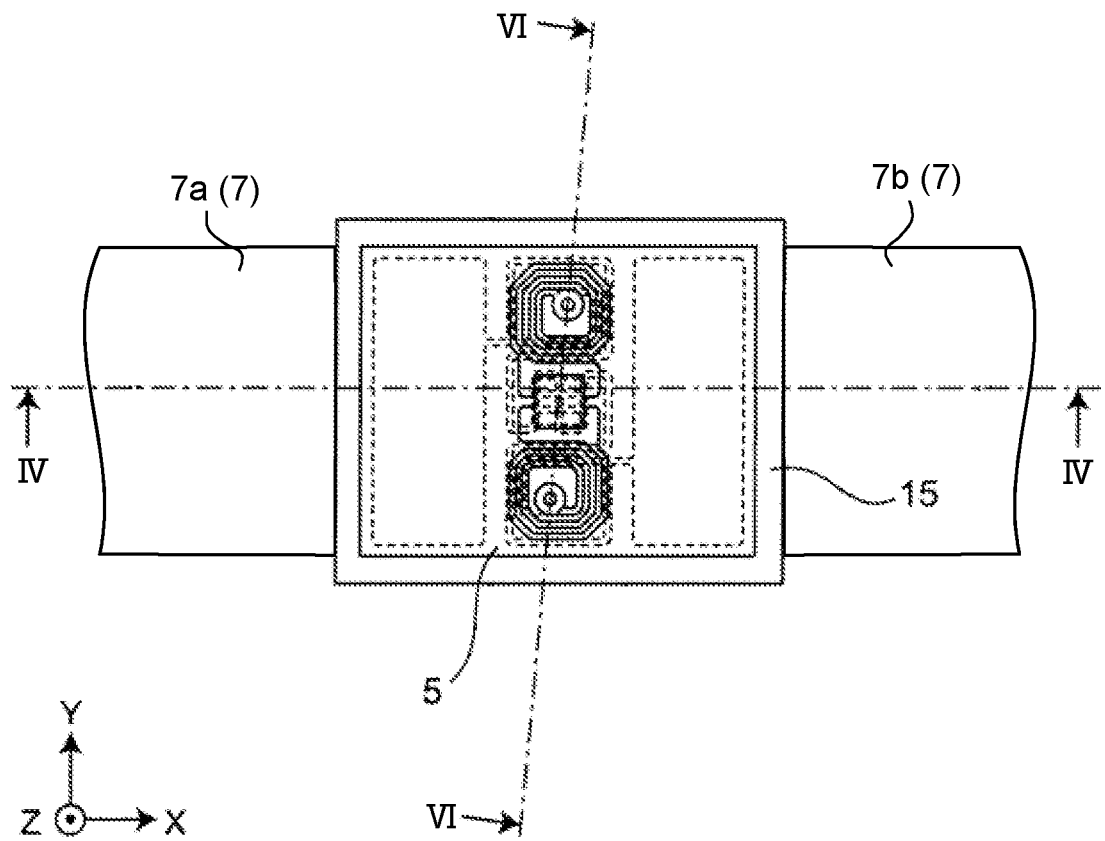
FIG. 3 is a perspective plan view of the RFID module.
Figure 4:
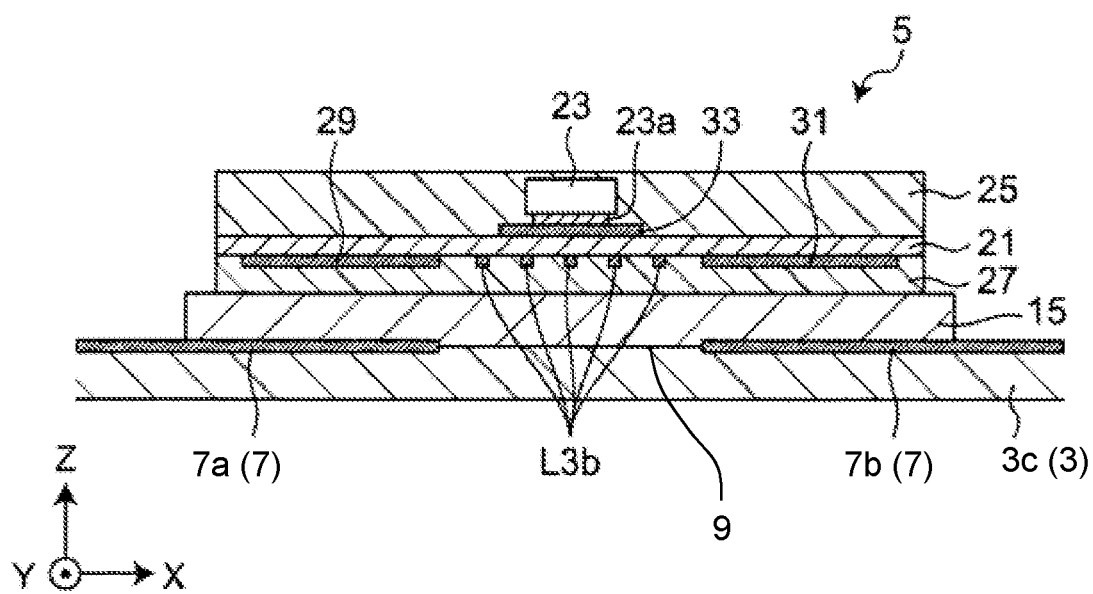
FIG. 4 is a cross-sectional view taken along line indicated by arrows IV in FIG. 3.
Figure 5:
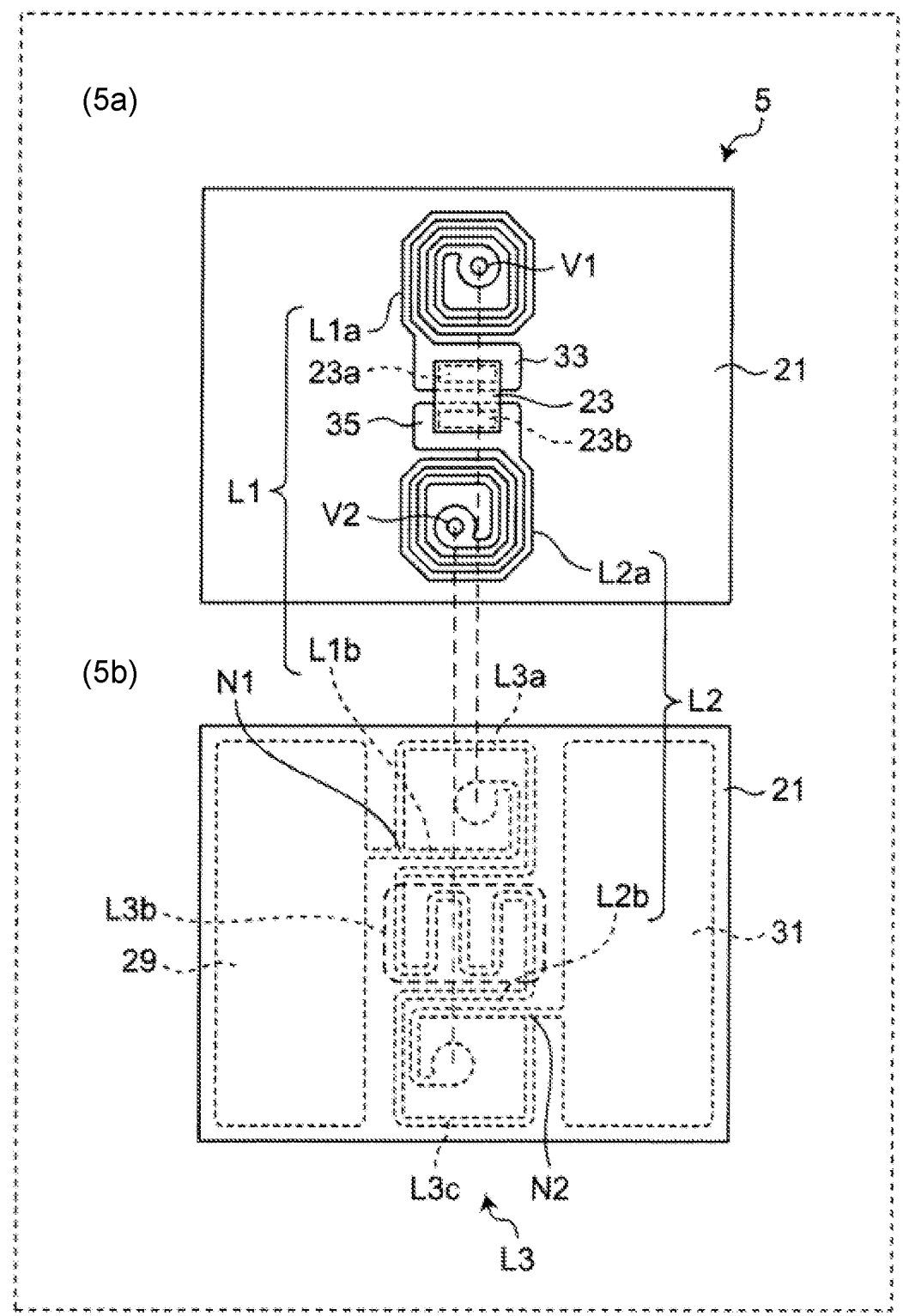
Figure 6:
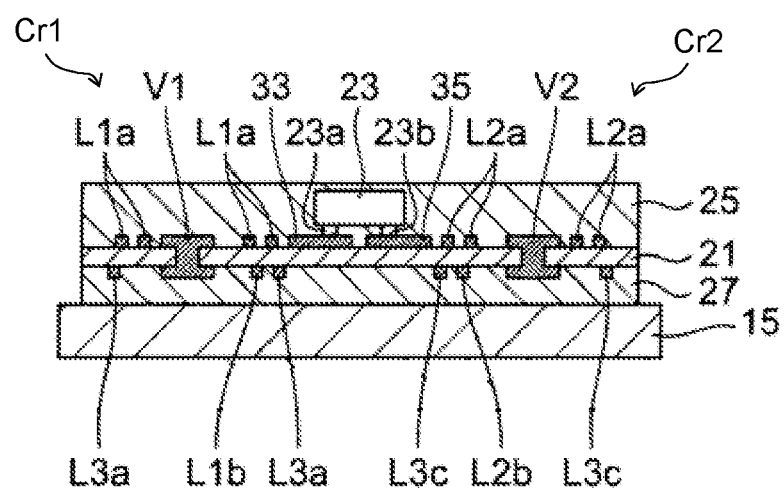
FIG. 6 is a cross-sectional view taken along line indicated by arrows VI in FIG. 3.

Next, a configuration of the RFID module 5 will be described with reference to FIGS. 3 to 6. FIG. 3 is a perspective plan view of the RFID module, and FIG. 4 is a cross-sectional view taken along line indicated by arrows IV in FIG. 3. FIG. 5 shows a plan view of a conductor pattern formed on a substrate of the RFID module, in which FIG. 5a is a plan view of a conductor pattern formed on an upper surface of the substrate of the RFID module, and FIG. 5b is a perspective plan view of a conductor pattern formed on a lower surface of the substrate as viewed from above. FIG. 6 is a cross-sectional view taken along line indicated by arrows VI in FIG. 3. In the drawings, the X-Y-Z coordinate system facilitates understanding of the invention and does not limit the invention. The X-axis direction indicates a longitudinal direction of the RFID module 5, the Y-axis direction indicates a depth (width) direction, and the Z-axis direction indicates a thickness direction. It is noted that the X, Y, and Z directions are orthogonal to one another.

As shown in FIG. 3, the RFID module 5 is bonded to the upper surface of the antenna pattern 7 with interposition of an adhesive 15 such as a double-sided tape or a synthetic resin.

As shown in FIG. 4, the RFID module 5 includes a substrate 21 and an RFIC 23 mounted on the substrate 21, which can be, for example, a flexible substrate such as polyimide. A protective film 25 is formed on the upper surface of the substrate 21 on which the RFIC 23 is mounted. The protective film 25 is, for example, an elastomer such as polyurethane or a hot melt agent such as ethylene vinyl acetate (EVA). A protection film 27 is also attached to the lower surface of the substrate 21. The protection film 27 is, for example, a cover lay film such as a polyimide film (e.g., Kapton tape).

With reference to FIG. 5, on the upper surface of the substrate 21, a third electrode 33, a fourth electrode 35, a conductor pattern L1a of the main portion of a first inductance element L1, and a conductor pattern L2a of the main portion of the second inductance element L2 are formed. The third electrode 33 is connected to one end of the conductor pattern L1a, and the fourth electrode 35 is connected to one end of the conductor pattern L2a. These conductor patterns are obtained by patterning a copper foil by photolithography, for example.

On the lower surface of the substrate 21, a first electrode 29 and a second electrode 31 each to be capacitively coupled to the antenna pattern 7 are formed. In addition, on the lower surface of the substrate 21, a conductor patterns L1b of a part of the first inductance element L1, and conductor patterns L3a, L3b (i.e., the conductor pattern surrounded by two-dot chain lines), and L3c of the third inductance element L3 are formed. These conductor patterns are also obtained by patterning a copper foil by photolithography, for example.

One end of the conductor pattern L1b of a part of the first inductance element L1 and one end of the conductor pattern L3a of the third inductance element L3 are connected to the first electrode 29. Similarly, one end of the conductor pattern L2b of the second inductance element L2 and one end of the conductor pattern L3c of the third inductance element L3 are connected to the second electrode 31. A conductor pattern L3b is connected between the other end of the conductor pattern L3a of the third inductance element L3 and the other end of the conductor pattern L3c.

The other end of the conductor pattern L1b of the first inductance element L1 and the other end of the conductor pattern L1a of the first inductance element L1 are connected through the via conductor V1. Similarly, the other end of the conductor pattern L2b of the second inductance element L2 and the other end of the conductor pattern L2a of the second inductance element L2 are connected through the via conductor V2.

The RFIC 23 is mounted on the third electrode 33 and the fourth electrode 35 formed on the upper surface of the substrate 21 in the exemplary aspect. That is, the terminal 23a of the RFIC 23 is connected to the third electrode 33, and the terminal 23b of the RFIC 23 is connected to the fourth electrode 35.

The first inductance element L1 and the conductor pattern L3a of the third inductance element L3 are each formed in different layers of the substrate 21, and are arranged in a relationship in which the respective coil openings overlap each other. Similarly, the second inductance element L2 and the conductor pattern L3c of the third inductance element L3 are each formed in different layers of the substrate 21, and are arranged in a relationship in which the respective coil openings overlap each other. Furthermore, the RFIC 23 is positioned between the second inductance element L2 and the conductor pattern L3c of the third inductance element L3, and the first inductance element L1 and the conductor pattern L3a of the third inductance element L3 on the surface of the substrate 21. The conductor patterns L1a, L1b, and L3a form a first coil Cr1, and the conductor patterns L2a, L2b, and L3c form a second coil Cr2.

In the RFID module 5, a first current path CP1 passing through the upper surface and the lower surface of the substrate 21 and a second current path CP2 passing through the lower surface of the substrate 21 are formed. The first current path CP1 reaches the second electrode 31 from the first electrode 29 through the branch point N1, the conductor pattern L1b, the conductor pattern L1a, the RFIC 23, the conductor pattern L2a, the conductor pattern L2b, and the branch point N2. The second current path CP2 reaches the second electrode 31 from the first electrode 29 through the branch point N1, the conductor pattern L3a, the conductor pattern L3b, the conductor pattern L3c, and the branch point N2. Here, the winding directions of the currents flowing through the first inductance element L1 including the conductor pattern L1b connected to the conductor pattern L1a through the via conductor V1 and the second inductance element L2 including the conductor pattern L2b connected to the conductor pattern L2a through the via conductor V2 are reverse to each other, and the magnetic field generated by the first inductance element L1 and the magnetic field generated by the second inductance element L2 cancel each other. The first current path CP1 and the second current path CP2 are each formed in parallel with each other between the first electrode 29 and the second electrode 31.

Conventionally, when a dipole antenna type antenna pattern is provided in a container, the dipole antenna can be affected by contents in the container and communication is hindered. This is because the physical length of the antenna pattern is fixed, and when the electrical length of the antenna pattern is affected and changed by contents such as liquid, communication may be disabled. Therefore, the dipole antenna is unsuitable as an antenna formed directly on the container.

Figure 7:
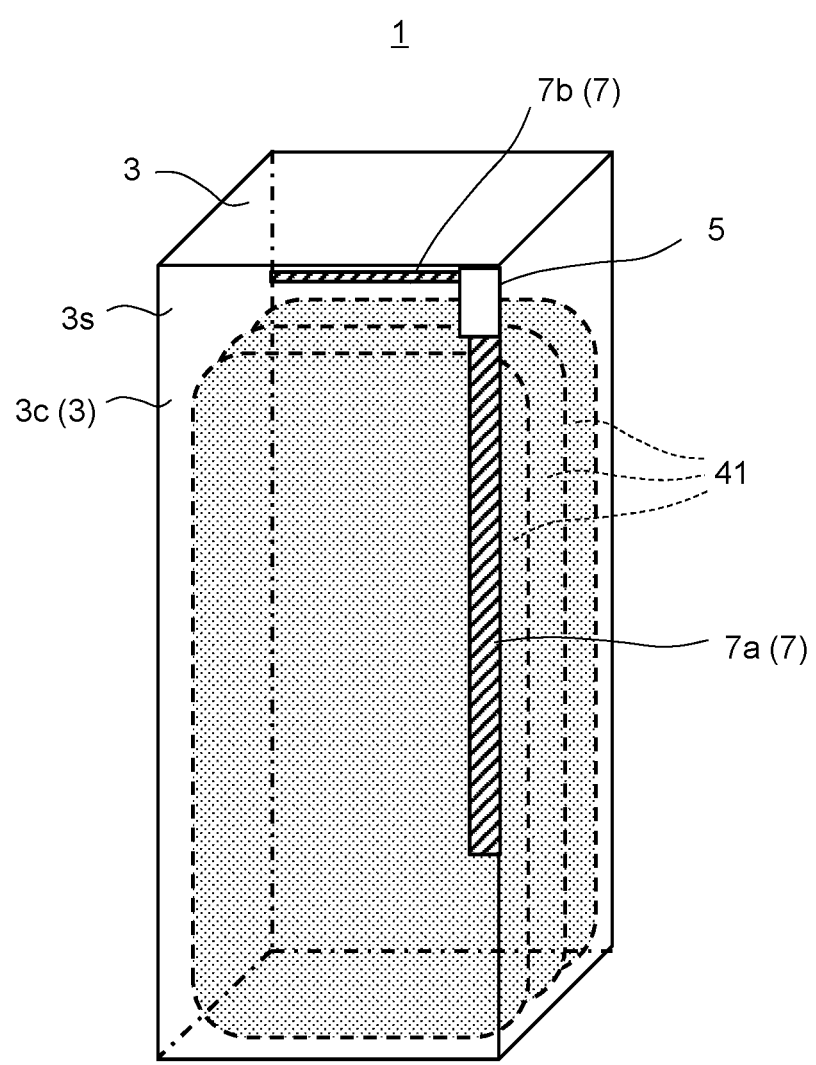
FIG. 7 is an overall perspective view of a container in a state where a metal-coated pouch is stored.

As shown in FIG. 7, when the dielectric, such as a liquid or the metal-coated pouch 41 such as a retort pouch (sealed pouch), is accommodated in the container, the metal coating of the pouch 41 and the antenna pattern 7 are capacitively coupled and affected, or the dielectric constant of the RFID tag is changed by the dielectric such as a liquid to be stored, and the electrical length of the antenna pattern 7 may be shorter than the physical length. In addition, the change in dielectric constant varies depending also on the distance between the contents and the antenna pattern 7. Therefore, every time the position of the contents changes within the container, the communication characteristics also change.

In the present embodiment, transmitting and receiving a high frequency signal using the eddy current generated in the antenna pattern 7 rather than causing series resonance in the antenna pattern 7, and providing the RFID module 5 with a filter circuit that transmits a current due to an electromagnetic wave at the resonance frequency of the communication frequency to the RFIC element allows the communication to be performed with almost no change in the communication frequency even when the antenna pattern 7 and the pouch 41 are capacitively coupled. In addition, when the contents are the metal-coated pouch 41, printing the antenna film 7a so as to face the contents through the base material 3 of the container 1 as shown in FIG. 7 and printing the antenna film 7b so as to be away from the metal-coated pouch 41 causes the antenna film 7b to have almost no capacitive coupling and the antenna film 7a to be selectively capacitively coupled to the metal coating surface. Thus, when an eddy current flows through the antenna film 7a, an eddy current also flows through the metal coating front surface due to capacitive coupling, so that the metal coating surface can also be used for transmission and reception of high frequency signals.

In addition, in the present embodiment, in order to avoid the wavelength change (e.g., a frequency change) due to the change in the dielectric constant, the frequency change due to the length of the antenna pattern 7 can be supported by fixing the resonance frequency using the RFID module 5, rather than frequency-designing based on the length of the antenna pattern 7.

In addition, the RFIC 23 is a small chip, and the first coil Cr1 and the second coil Cr2 having laminated structures have respective coil patterns wound so as to cancel the magnetic field. Accordingly, the periphery of the RFIC 23 is fixed at the dielectric constant of the RFID module 5, and is not affected by the dielectric (e.g., the contents) housed in the container 1, so that the frequency that matches the RFIC 23 does not change. Referring to FIG. 6, the dielectric constant of the substrate 21 between the conductor patterns L1a and L2a and the conductor patterns L3a and L3c is fixed, and there is no change between the line capacitances. In addition, the conductor patterns L1a and L2a and the conductor patterns L3a and L3c are respectively covered with a protective film 25 and a protection film 27 as protective layers having fixed dielectric constants. In this manner, the dielectric constant of the RFID module 5 is fixed.

In addition, in order to reduce the influence of the dielectric constant of the dielectric in the container 1, a figure-eight coil is formed by the first coil Cr1 and the second coil Cr2 of the RFID module 5, and the magnetic field of the RFID module 5 is less likely to leak to the outside. Since the magnetic field of the RFID module 5 is less likely to leak, the inductance value is less likely to change due to an external factor.

In addition, since the magnetic flux of the RFID module 5 is also closed, the change in the frequency that matches the RFIC 23 becomes small even when a metal is to be housed in the container 1.

Figure 8:
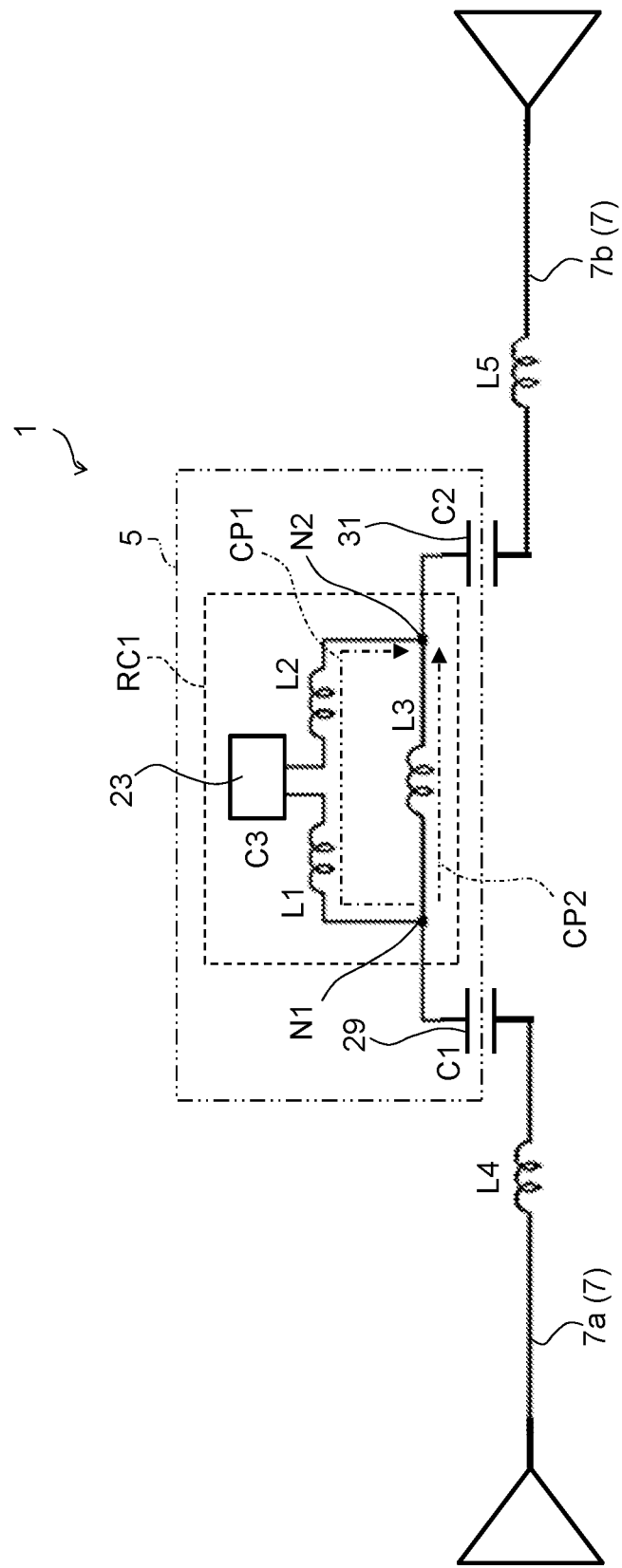
FIG. 8 is an equivalent circuit diagram of the RFID module.

Next, a circuit configuration of the RFID module 5 will be described with reference to FIG. 8. FIG. 8 is an equivalent circuit diagram of the RFID module 5.

In the RFID module 5, since the first current path CP1 is a part of the parallel resonance circuit RC1 being the LC parallel resonance circuit and matches the radio wave at the communication frequency, when the antenna pattern 7 receives the radio wave at the communication frequency, a current flows through the RFIC 23.

In the RFID module 5, a parallel resonance circuit RC1 is formed, which is a loop circuit including the first inductance element L1, the RFIC 23, the second inductance element L2, and the third inductance element L3.

The capacitor C1 includes a first antenna film 7a, a first electrode 29, an adhesive 15, and a protection film 27. The capacitor C2 includes a second antenna film 7b, a second electrode 31, an adhesive 15, and a protection film 27. The fourth inductance element L4 is an inductance component of the first antenna film 7a of the antenna pattern 7, and the fifth inductance element L5 is an inductance component of the second antenna film 7b of the antenna pattern 7.

In operation, the parallel resonance circuit RC1 is configured to perform LC parallel resonance by impedance matching with respect to a radio wave at the communication frequency. Accordingly, matching with the RFIC is achieved at the communication frequency, and the communication distance of the RFID module 5 at the communication frequency can be secured.

Figure 9:
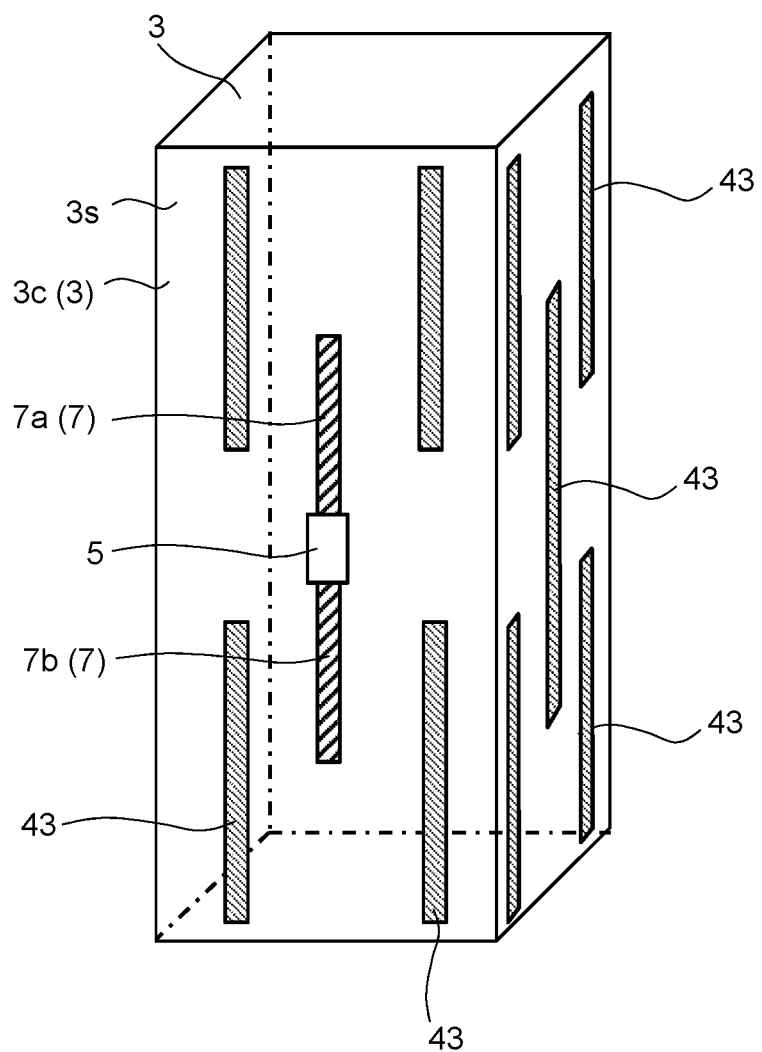
FIG. 9 is an overall perspective view of a container in a modification of the exemplary embodiment.

In the container 1 of the present embodiment, as shown in FIG. 9, the antenna pattern 7 may be a part of the pattern 43 of the container 1. The pattern 43 may be a metal film or a resin film.

Figure 10:
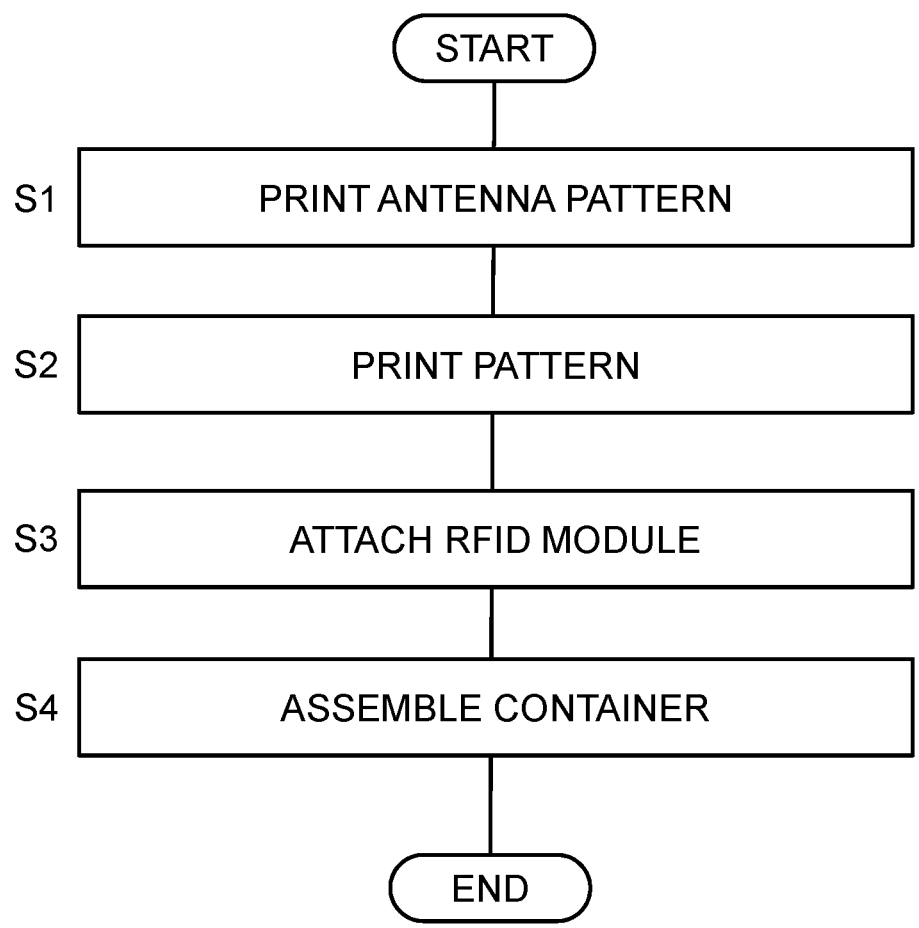
FIG. 10 is a flowchart showing a flow for manufacturing the container of the exemplary embodiment.

Next, a method for manufacturing the container 1 will be described with reference to FIG. 10. FIG. 10 is a flowchart showing a flow for manufacturing the container of the present embodiment.

In step S1, an antenna pattern 7 is printed and formed on the first main surface 3s of the base material 3 of the container 1 before assembly. The antenna pattern 7 can be formed by gravure printing or offset printing according to exemplary aspects. By using gravure printing or offset printing, the antenna pattern 7 can be printed at high speed.

In step S2, a pattern 43 is printed and formed on the first main surface 3s of the base material 3 of the container 1. The pattern 43 can be formed by gravure printing or offset printing as with the antenna pattern 7. It should be noted that step S1 and step S2 may be performed separately, or may be performed simultaneously or continuously in various exemplary aspects. When steps S1 and S2 are performed in the same printing step, since the pattern 43 and the antenna pattern 7 can be simultaneously or continuously printed and formed on the container 1, the position of the antenna pattern 7 can be fixed with respect to the container 1, and the positional relationship between the contents and the antenna pattern 7 can be individually designed. In addition, by performing white entire surface printing or pattern printing on the antenna film (7a, 7b), it is also possible to improve the designability by making the antenna pattern 7 difficult to be visually recognized.

In step S3, the RFID module 5 is attached onto the antenna pattern 7. The RFID module 5 is attached to the upper surface of the antenna pattern 7 with interposition of the adhesive 15.

In step S4, the container 1 is assembled. It should be noted that the container 1 can also be shipped to the user in a state before being assembled. In this case, on the user side, the container 1 is assembled and contents are stored in the container 1.

As described above, the container 1 of the present embodiment is a container 1 including the RFID module 5, and includes an insulating base material 3 (also referred to as a "base") forming the outer shape of the container 1 and an antenna pattern 7 including the first antenna film 7 a and the second antenna film 7 b formed on the first main surface 3 s of the base material 3. The RFID module 5 includes an RFIC 23, a parallel resonance circuit RC1 as a filter circuit that transmits, to the RFIC 23, a current due to an electromagnetic wave at a natural resonance frequency being a communication frequency, and a first electrode 29 and a second electrode 31 connected to the parallel resonance circuit RC1. The first electrode 29 of the RFID module 5 and the first antenna film 7 a are electrically connected to each other. The sheet resistance of each of the first antenna film 7 a and the second antenna film 7 b is 0.5Ω/sq or more.

Since the sheet resistance of each of the first antenna film 7 a and the second antenna film 7 b is 0.5Ω/sq or more, and the antenna pattern 7 can be formed by printing, printing of the pattern and printing of the antenna pattern, on the container 1, can also be performed simultaneously, and the manufacturing efficiency of the container 1 on which the pattern is printed can be improved. In addition, since the antenna pattern 7 can also be directly printed on the container 1, the degree of freedom of designing the shape of the antenna pattern 7 can be improved, and the container 1 including the RFID module 5 in which reduction in designability of the container 1 is suppressed can be provided. In addition, since the antenna patterns 7 can be formed in large quantity at a high speed by printing, the container 1 including the RFID module 5 can be provided at a lower cost than the conventional case.

In addition, in the configuration in which the conventional RFID tag is attached to the container, causing a series resonance of a high frequency at the communication frequency using the antenna pattern implements the electromagnetic wave radiation. In this case, when there is a metal object inside the container, the metal object and both ends of the antenna pattern are capacitively coupled, and a closed circuit is formed from an end portion of one antenna pattern to an end portion of the other antenna pattern through the metal object, the radiation of the electromagnetic wave is not generated, and operation as an antenna is disabled.

When there is a dielectric such as moisture inside the container, since the dielectric is positioned near the antenna pattern, the dielectric constant around the antenna pattern increases. Accordingly, the wavelength is shortened, and the series resonance frequency becomes lower than that of the initial setting of the antenna. Since the series resonance frequency changes depending on the distance between the antenna pattern and the dielectric and the ratio of the antenna pattern near the dielectric, the configuration in which the RFID tag is attached as in the conventional case has antenna operation made unstable due to the contents.

On the other hand, in the container 1 of the present embodiment, the antenna pattern 7 is formed on the base material 3 of the container 1, and the sheet resistance of each of the first antenna film 7a and the second antenna film 7b is 0.5Ω/□ or more, so that an eddy current is generated instead of series resonance being generated in the antenna pattern 7. The eddy current generated in the antenna pattern 7 is matched by the parallel resonance circuit RC1 included in the RFID module 5 to supply power to the RFIC 23. Since the antenna pattern 7 can be printed anywhere on the surface of the container 1 and the frequency-designing is not performed based on the antenna pattern length, the degree of freedom of the pattern is also increased. Thus, the antenna pattern 7 can have an optimum pattern shape with respect to the shapes of the container 1 and the contents. Therefore, even when there is metal or water in the box, the electromagnetic wave can be radiated from the antenna pattern 7. As described above, since the container 1 including the RFID module 5 of the present embodiment does not use series resonance, wireless communication is facilitated even when a metal material or a dielectric are present around the antenna pattern in the container 1.

In addition, the antenna pattern 7 is formed on the first main surface 3s of the base material 3 as a part of the pattern. As described above, since the antenna pattern 7 can be used as a part of the decorative printing, the designability of the container 1 can be improved.

Figure 11:
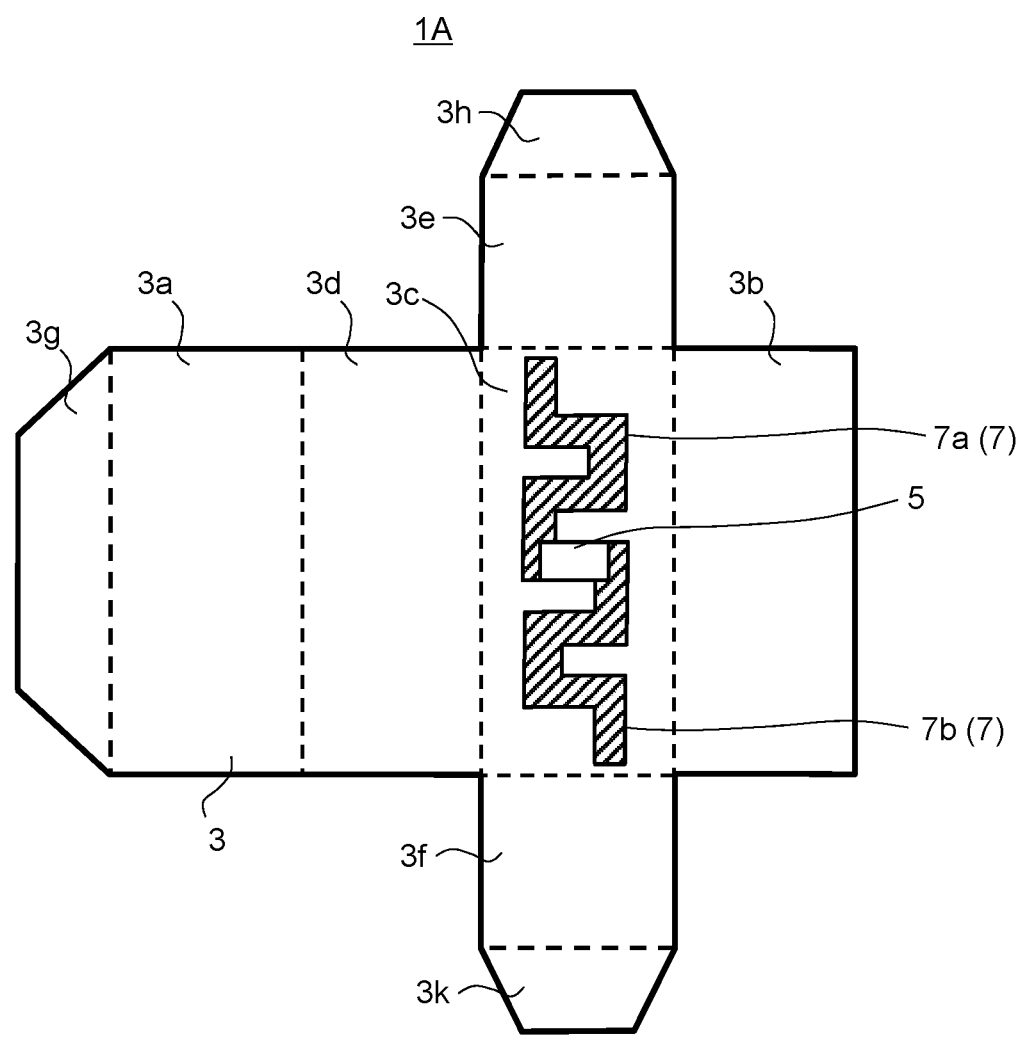
FIG. 11 is a developed view of a container in a modification of the exemplary embodiment.

Next, a first modification of the exemplary embodiment will be described with reference to FIG. 11. FIG. 11 is a developed view of a container 1A in the first modification. The container 1A in the first modification has a configuration in which the antenna pattern 7 of the container 1 of the embodiment has a meander shape. As described above, the first antenna film 7a and the second antenna film 7b of antenna pattern 7 may extend in a meander shape. The other configurations in the container 1A of the first modification are substantially the same as those of the container 1 of the embodiment. Since the communication characteristics do not change even with this configuration, the container 1A of the first modification can obtain the same effects as the container 1 of the embodiment.

Figure 12:
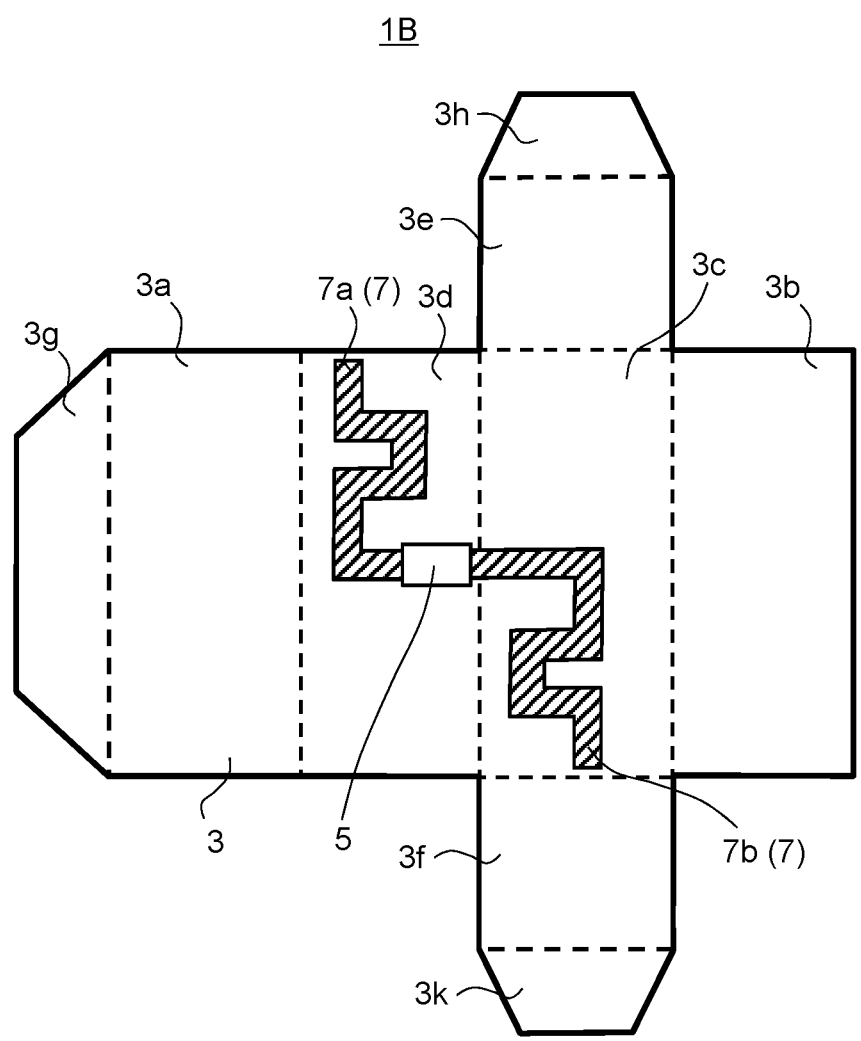
FIG. 12 is a developed view of a container in a modification of the exemplary embodiment.

Next, a second modification of the exemplary embodiment will be described with reference to FIG. 12. FIG. 12 is a developed view of a container 1B in the second modification. The container 1B in the second modification has a configuration in which the antenna pattern 7 of the container 1 of the embodiment is formed across two surfaces of the third surface 3c and the fourth surface 3d. In addition, similarly to the first modification, the antenna pattern 7 has a meander shape. The other configurations of the container 1B of the second modification are substantially the same as those of the container 1 of the embodiment. Since the communication characteristics do not change even with this configuration, the container 1B of the second modification can obtain the same effects as the container 1 of the embodiment.

Figure 13:
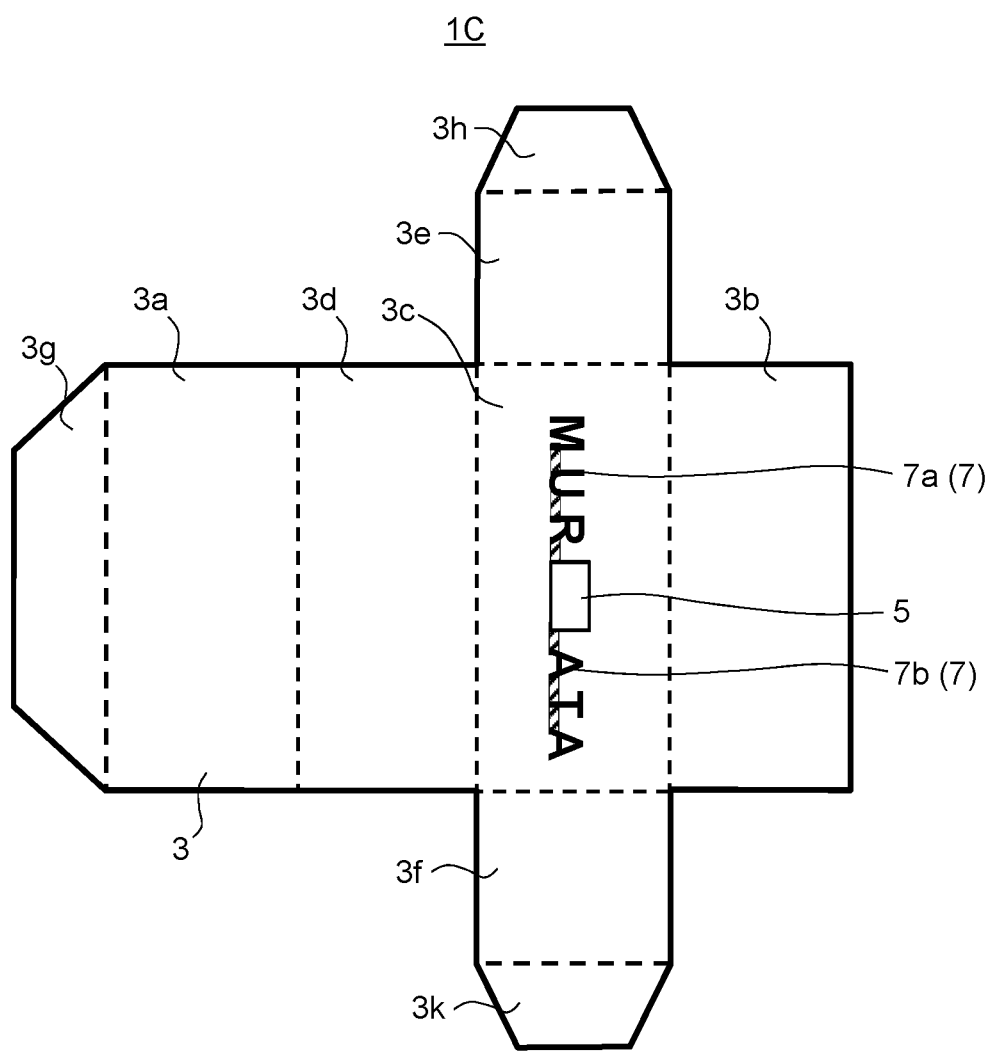
FIG. 13 is a developed view of a container in a modification of the exemplary embodiment.

Next, a third modification of the exemplary embodiment will be described with reference to FIG. 13. FIG. 13 is a developed view of a container 1C in the third modification of the embodiment. The container 1C in the third modification of the embodiment has a shape in which the antenna pattern 7 includes a logotype in the container 1 of the embodiment. In FIG. 13, a logotype of "MURATA" is formed as an antenna pattern, and the logotype functions as an antenna. The antenna pattern 7 may include a logomark instead of the logotype, or may include a combination of the logotype and the logomark. Since the communication characteristics do not change even with this configuration, the container 1C of the third modification can obtain the same effects as the container 1 of the embodiment.

As described above, the pattern is a printed matter that decorates the container 1 formed on the first main surface 3s of the container 1, and includes, for example, a graphic, a picture, a character, a logotype, a logomark, and a combination thereof.

Figure 14B:
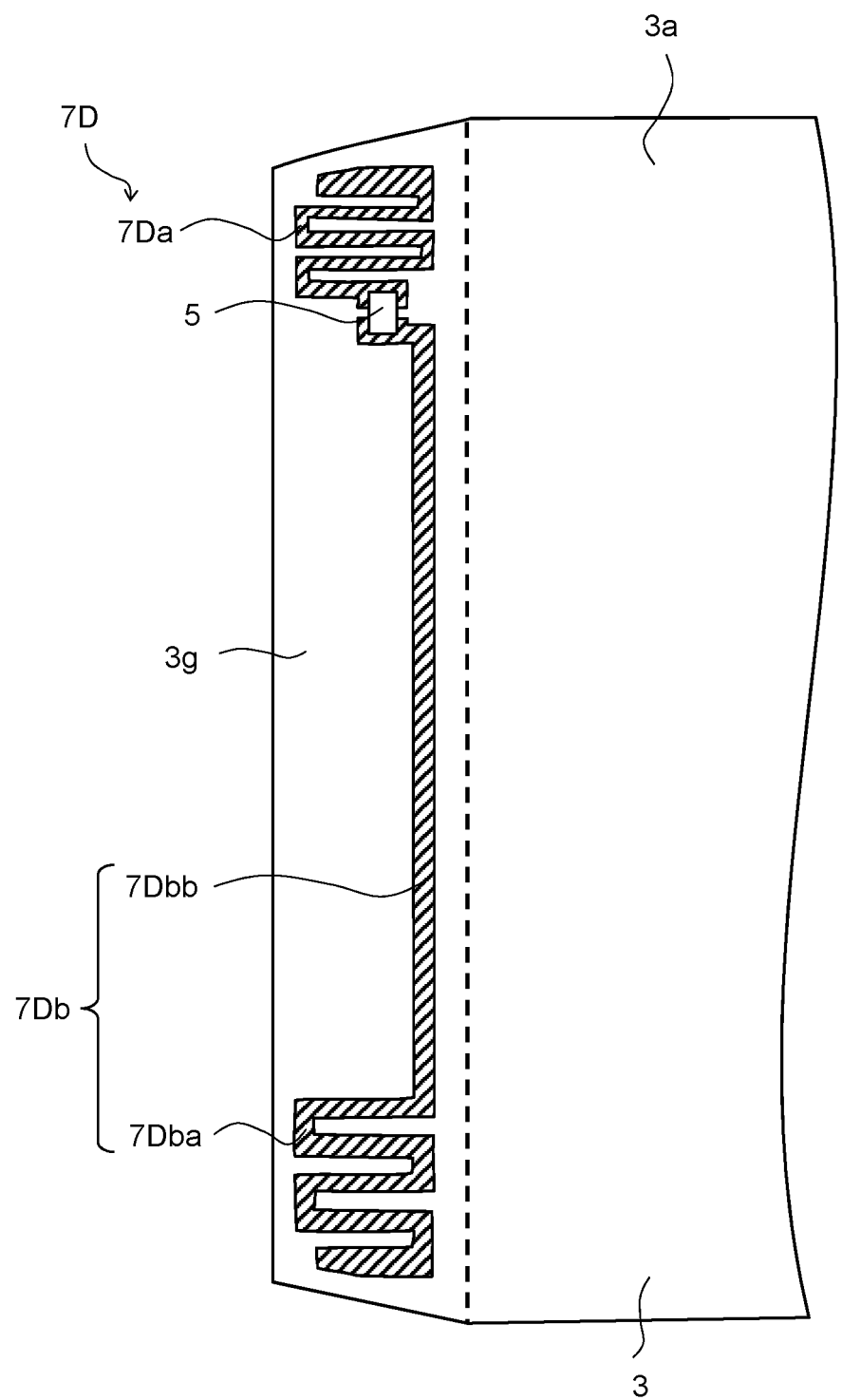
FIG. 14B is a partially enlarged view of a developed view of a container in a modification of the exemplary embodiment.
Figure 15:
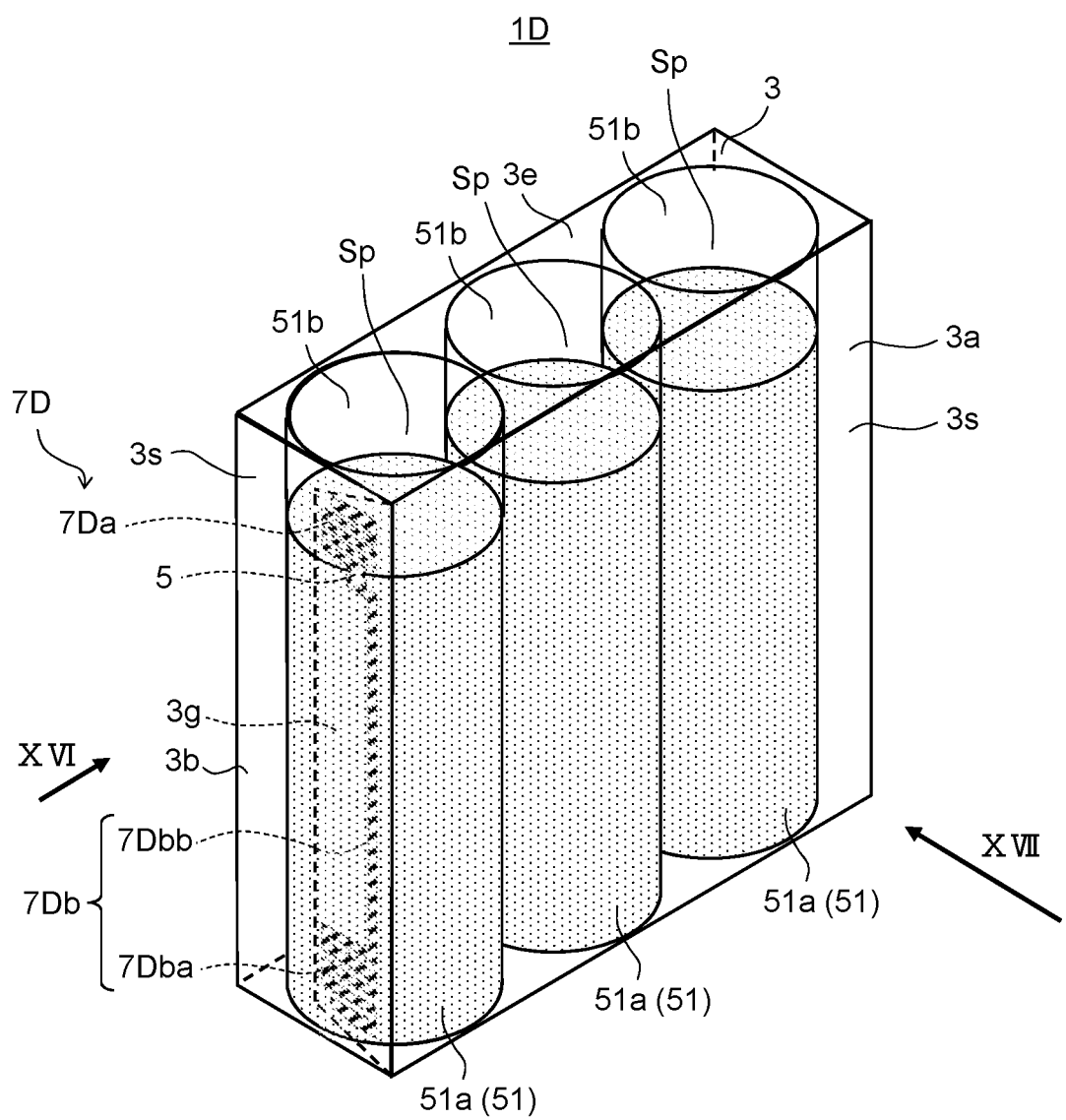
FIG. 15 is a see-through perspective view of a container in a modification of the exemplary embodiment.
Figure 16:
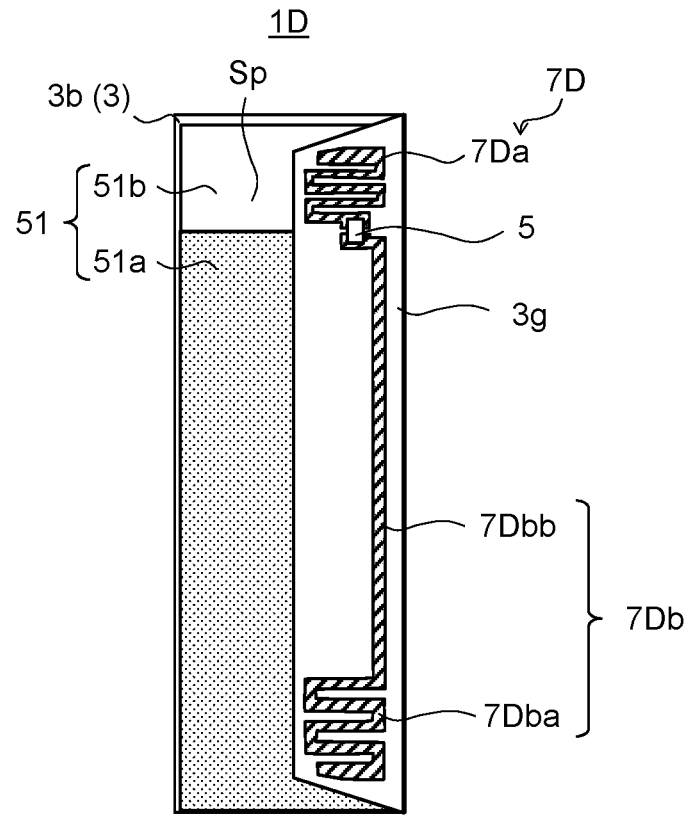
FIG. 16 is a perspective side view of a container in a modification of the exemplary embodiment.
Figure 17:
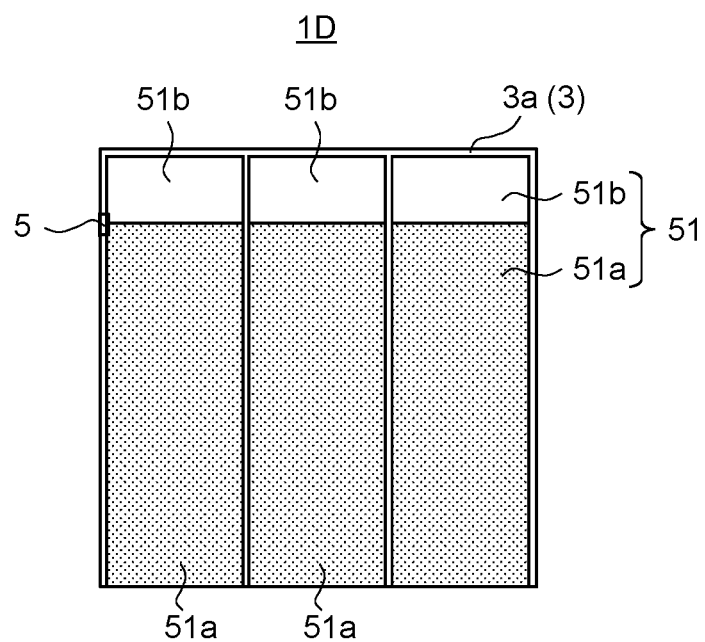
FIG. 17 is a perspective front view of a container in a modification of the exemplary embodiment.

Next, a fourth modification of the embodiment will be described with reference to FIGS. 14A to 17. FIG. 14A is a developed view of a container 1D in the fourth modification of the embodiment. FIG. 14B is a partially enlarged view of a developed view of the container 1D. FIG. 15 is a see-through perspective view of the container 1D. FIG. 16 is a view taken along line indicated by arrows XVI in FIG. 15, and is a perspective side view of the container 1D. FIG. 17 is a view taken along line indicated by arrows XVII in FIG. 15, and is a perspective front view of the container 1D.

The container 1D in the fourth modification of the exemplary embodiment is a modification of the container 1 shown in FIG. 7, and has a configuration in which the antenna pattern 7 in the container 1 of the embodiment is formed on the first flap 3g. The base material 3 has a first surface 3a and a second surface 3b each of which has a first main surface 3s serving as a side surface of the box-shaped container 1D, and a first flap 3g continuous with the first surface 3a for connecting the first surface 3a and the second surface 3b with an adhesive layer. In a side view, the first antenna film 7Da is formed on the first flap 3g so as to overlap the lid 51b, and the second antenna film 7Db is formed on the first flap 3g so as to overlap the container main body 51a. In addition, the container 1D includes flaps other than the first flap 3g to the third flap 3k for preventing dust from entering the assembled container 51 and for reinforcement, for example.

As shown in FIG. 14A, the antenna pattern 7D in the fourth modification of the embodiment is an asymmetric dipole antenna. The antenna pattern 7D includes a first antenna film 7Da having a meander-shaped pattern and a second antenna film 7Db longer than the first antenna film 7Da. The second antenna film 7Db has a meander-shaped pattern 7Dba and a linear-shaped pattern 7Dbb. The antenna pattern 7D is formed by, for example, foil stamping of vapor deposition foil or printing of a conductive paste. The RFID module 5 and the first antenna film 7Da are disposed at a upper part of the container 1D, and the second antenna film 7Db extends from the RFID module 5 to a lower part of the container 1D. For example, the linear-shaped pattern 7Dbb of the second antenna film 7Db is disposed from the upper part of the container 1D to the lower part of the container 1D, and the meander-shaped pattern 7Dba of the second antenna film 7Db is disposed only at the lower part of the container 1D.

When assembled to a box, the container 1D further houses inside one or more containers 51. The container 51 includes a container main body 51a that houses liquid such as water, and a lid 51b that is attached to the container main body 51a and has a hollow inside. The container main body 51a is made of metal or resin, for example. The container main body 51a may be a metal article itself. The lid 51b is made of resin, for example. Therefore, the lid 51b secures a space Sp having almost no liquid or metal between the container main body 51a and the fifth surface being the upper surface of the container 1D in the container 1D.

According to the container 1D in the fourth modification of the exemplary embodiment, since the antenna pattern 7D and the RFID module 5 are formed on the first flap 3g, the antenna pattern 7D and the RFID module 5 are hidden in appearance when the box is formed, and do not affect the designability of the container 1D. In addition, since the RFID module 5 is sandwiched between the first flap 3g and the second surface 3b at the time of assembling the box, the RFID module 5 does not come into contact with the container 51 being the contents. Therefore, there is no possibility that the RFID module 5 falls off the container 1D due to the container 51 being taken in and out.

In addition, since the first antenna film 7Da being one electrode of the antenna pattern 7D is disposed away from the container main body 51a housing liquid being contents, or the container main body 51a being metal, the first antenna film 7Da is less likely to be affected by liquid or metal contents, and the reduction in the communication characteristics can be suppressed.

Figure 18:
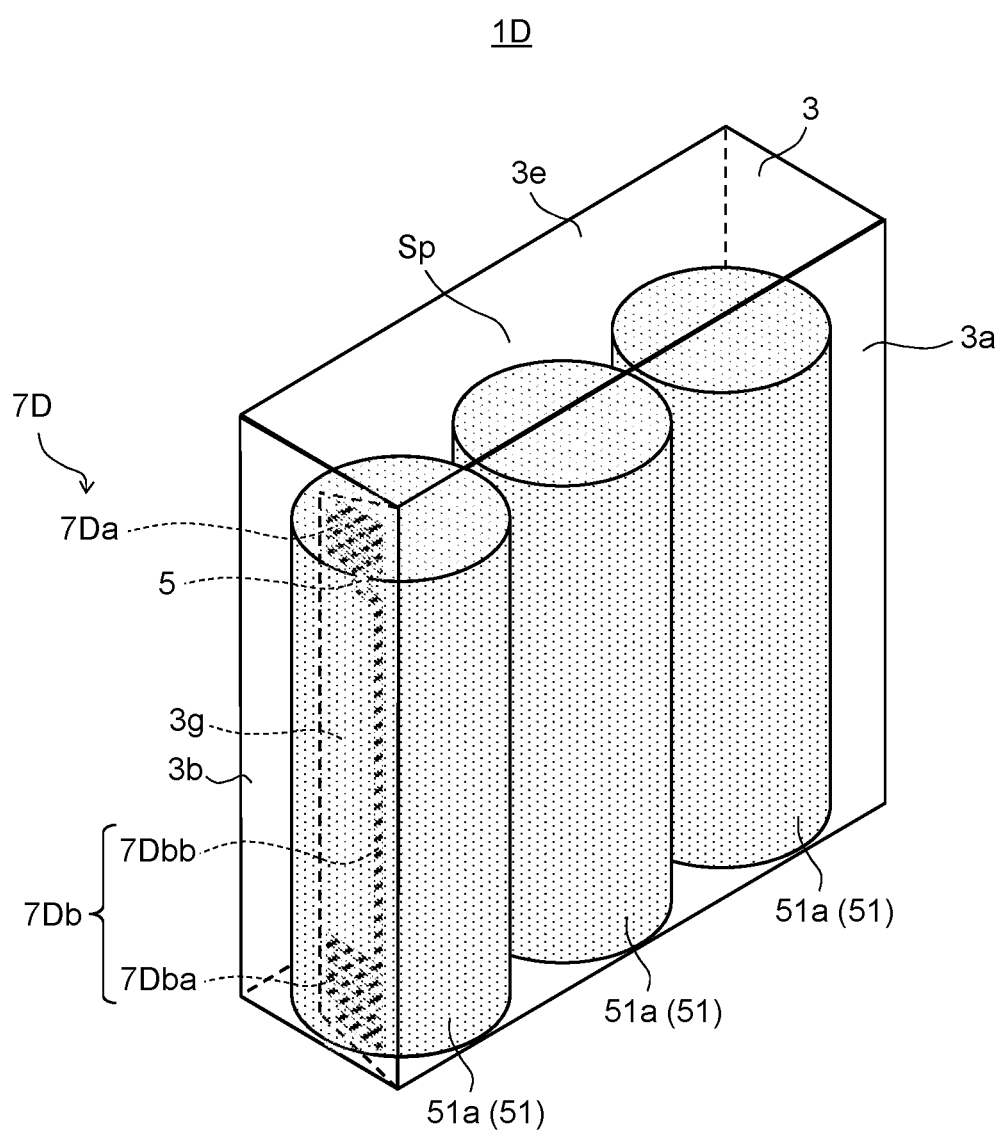
FIG. 18 is a see-through perspective view of a container in a modification of the exemplary embodiment.

It should be noted that as shown in FIG. 18, the container 51 does not need to include the lid 51b. In this case, the height of the container 1D is secured to such an extent that the space Sp is formed between the upper surface of the container 51 and the fifth surface 3e of the container 1D. In a side view, the first antenna film 7 Da is formed on the first flap 3g so as to overlap the space Sp between the upper surface of the container 51 and the fifth surface 3e of the container 1D. Accordingly, effects similar to the effects described above can be obtained according to this configuration.

Figure 19:
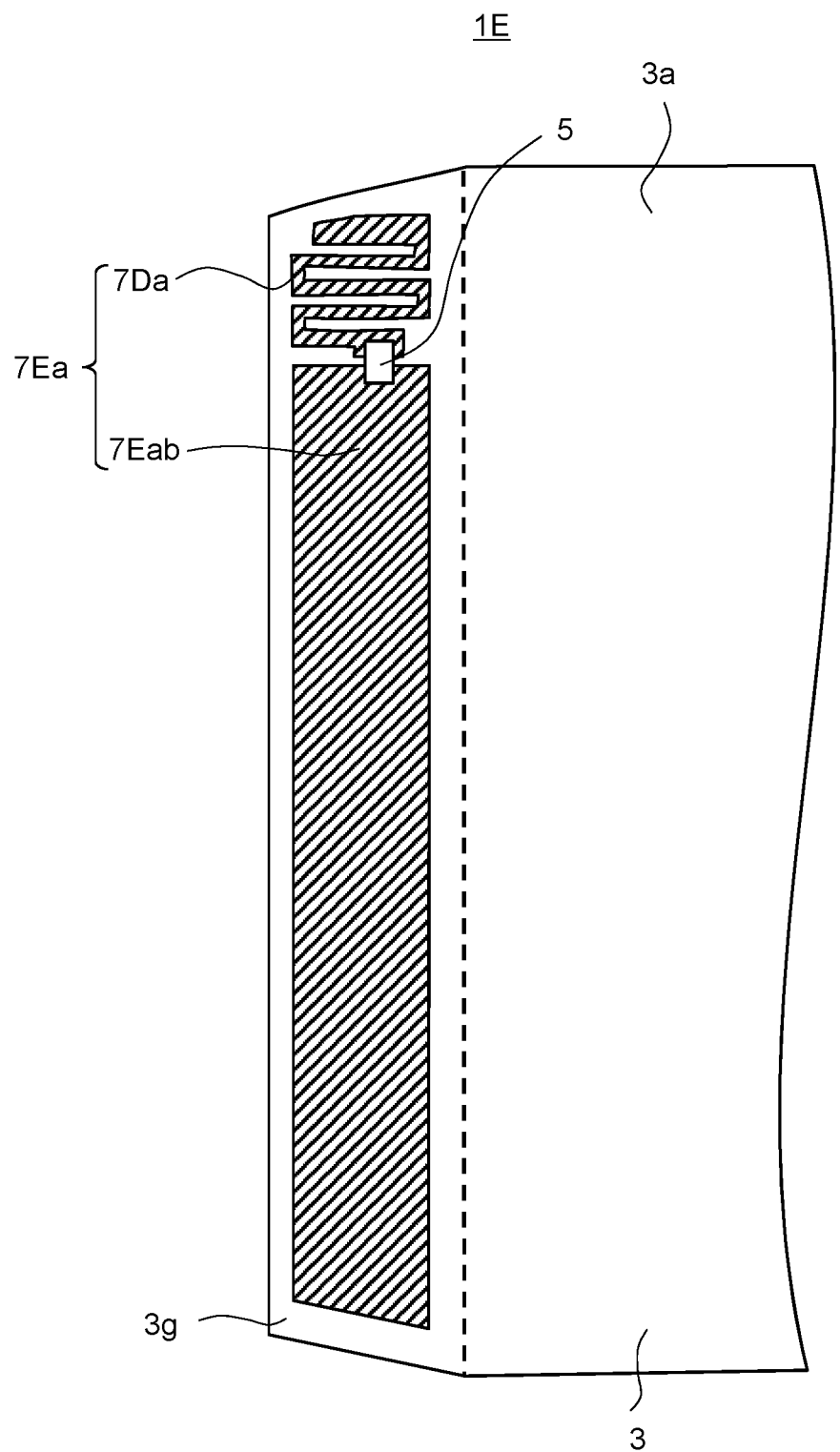
FIG. 19 is a partially enlarged view of a developed view of a container in a modification of the exemplary embodiment.

In addition, as shown in FIG. 19, in the antenna pattern 7Ea formed on the first flap 3g, the first antenna film 7Da has a meander shape, but the second antenna film 7Eab may have a flat plate shape instead of the meander shape. Since the second antenna film 7Eab on the flat plate is disposed so as to overlap the contents of the container 1E in a side view at the time of assembling the box, the same effects as the above-described effects can be obtained.

Figure 20B:
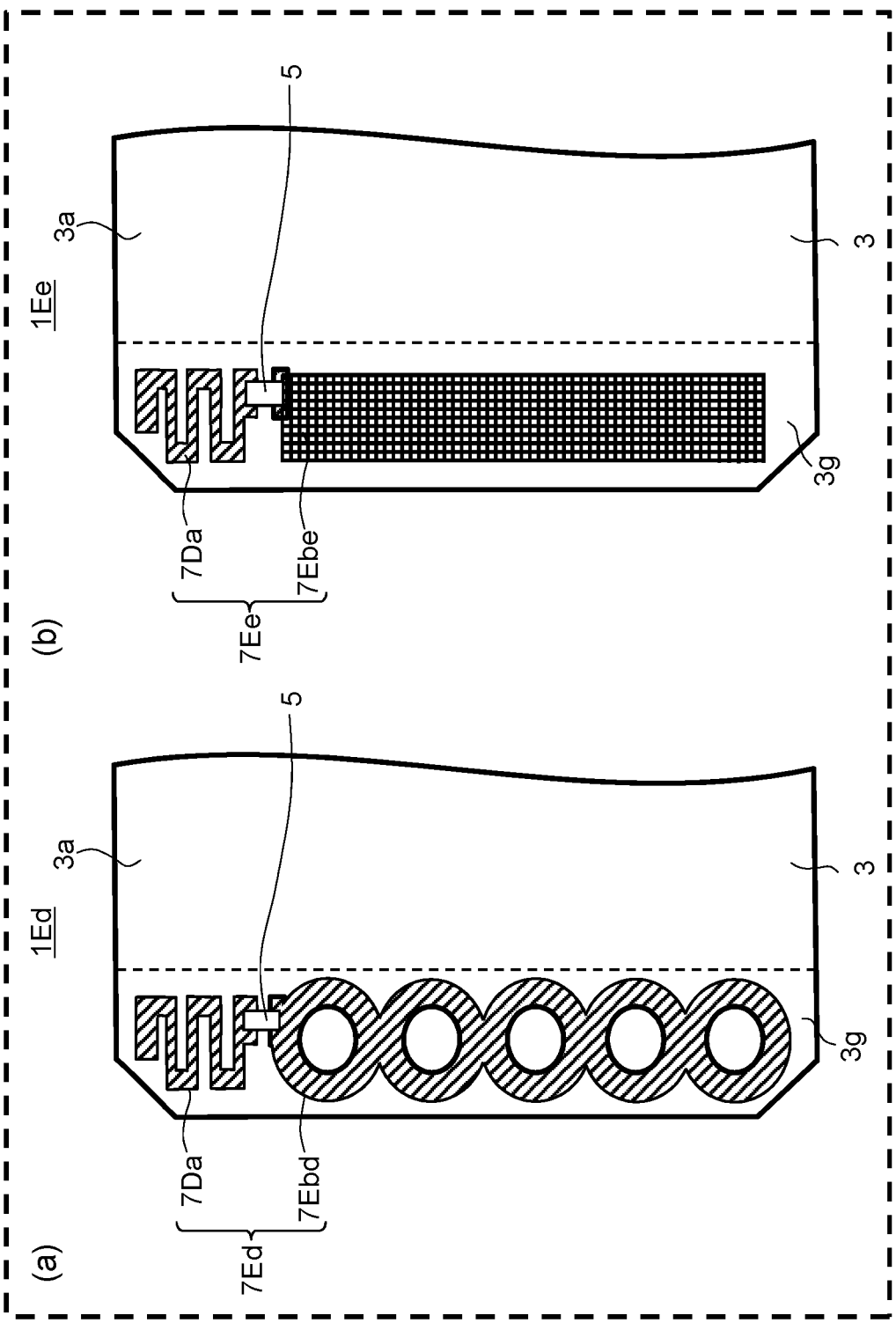
FIG. 20B is a partially enlarged view of a developed view of a container in a modification of the exemplary embodiment.

In addition, the second antenna film 7E*ab* of the antenna pattern 7E*a* formed on the first flap 3*g* may have various shapes in addition to the flat plate shape. FIGS. 20A and 20B show examples of the shape of the second antenna film. Each of FIGS. 20A(a), 20A(b), 20B(a), and 20B(b) is a partially enlarged views of a developed view of a container in a modification of the embodiment.

As shown in FIG. 20A(a), the second antenna film 7E*bb* of the antenna pattern 7E*b* formed on the first flap 3*g* of the container 1E*b* may have an uneven shape on the side of the side portion of the first flap 3*g*.

In addition, as shown in FIG. 20A(b), the second antenna film 7E*bc* of the antenna pattern 7E*c* formed on the first flap 3*g* of the container 1E*c* may have a waveform shape that vibrates in the width direction of the first flap 3*g*.

In addition, as shown in FIG. 20B(a), the second antenna film 7E*bd* of the antenna pattern 7E*d* formed on the first flap 3*g* of the container 1E*d* may be configured by combining a plurality of annular conductor patterns.

In addition, as shown in FIG. 20B(b), in the second antenna film 7E*be* of the antenna pattern 7E*e* formed on the first flap 3*g* of the container 1E*e*, a plurality of conductor patterns may be formed in a mesh shape. As described above, according to the antenna patterns 7E*b* to 7E*e*, since the non-metallic region of the first flap 3*g* can be increased more than that of the antenna pattern 7E, the region where the base material 3 of the first flap 3*g* is exposed and the region where the base material 3 of the second surface 3*b* is exposed can be directly bonded by the adhesive layer 11. Accordingly, the adhesive force between the first flap 3*g* and the second surface can be improved.

Figure 21B:
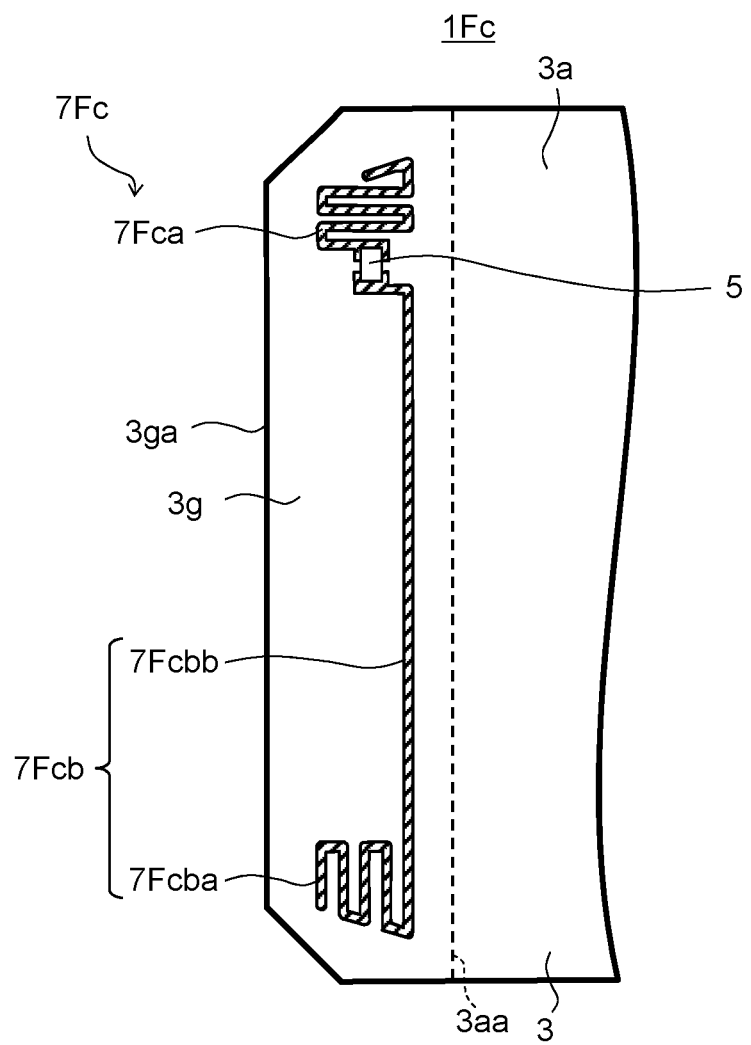
FIG. 21B is a partially enlarged view of a developed view of a container in a modification of the exemplary embodiment.

In addition, in the antenna pattern 7D of the container 1D in the fourth modification of the embodiment, the first antenna film 7D*a* and the second antenna film 7D*b* having meander shapes may additionally have meander shapes as shown in FIGS. 21A and 21B. It should be appreciated that each of FIGS. 21A(a), 21A(b), 21B(a), and 21B(b) is a partially enlarged views of a developed view of a container in a modification of the exemplary embodiment.

As shown in FIG. 21A(a), the antenna pattern 7F*a* of the container 1F*a* has a first antenna film 7F*aa* and a second antenna film 7F*ab* longer than the first antenna film 7F*aa* which have meander shapes. Similarly, the second antenna film 7F*ab* has a meander-shaped pattern 7F*aba* and a linear-shaped pattern 7F*abb*. The first antenna film 7F*aa* and the pattern 7F*aba* are formed at both end portions in the longitudinal direction of the first flap 3*g*.

The tip of each of the first antenna film 7F*aa* and the pattern 7F*aba* extends so as to face the corner between the first flap 3*g* and the first surface 3*a* in a state where the container 1F*a* is assembled, that is, in a state where the first flap 3*g* is bent from the first surface 3*a* along the side 3*aa* between the first flap 3*g* and the first surface 3*a*. The tip of each of the first antenna film 7F*aa* and the pattern 7F*aba* extends to near the side 3*aa* serving as a fold, whereby each tip of the antenna pattern 7F*a* extends to the edge portion of the box-shaped container 1F*a*. Accordingly, since the antenna pattern 7F*a* is separated away from the contents housed in the container 1F*a*, the influence of the contents on the antenna pattern 7F*a* can be reduced when the contents are metal-coated pouch 41.

As shown in FIG. 21A(a), in the meander shapes of the first antenna film 7F*aa* and the pattern 7F*aba*, the amplitude of the meander shape may be formed in the width direction of the first flap 3*g*, or as shown in FIG. 21A(b), the amplitude of the meander shape may be formed in an oblique direction so that the meander-shaped pattern faces the corner between the first flap 3*g* and the first surface 3*a* from the half way.

As shown in FIG. 21A(b), the antenna pattern 7F*b* of the container 1F*b* has a first antenna film 7F*ba* and a second antenna film 7F*bb* longer than the first antenna film 7F*ba* which have meander shapes. The second antenna film 7F*bb* has a meander-shaped pattern 7F*bba* and a linear-shaped pattern 7F*bbb*. The first antenna film 7F*ba* and the pattern 7F*bba* are formed at both end portions in the longitudinal direction of the first flap 3*g*, and each tip portion extends near the side 3*aa* serving as a fold.

In addition, the influence of the contents can be reduced by adopting the antenna pattern as shown in FIG. 21B(a). The antenna pattern 7F*c* of the container 1F*c* has a first antenna film 7F*ca* and a second antenna film 7F*cb* longer than the first antenna film 7F*ca* which have meander shapes. The second antenna film 7F*cb* has a meander-shaped pattern 7F*cba* and a linear-shaped pattern 7F*cbb*. The first antenna film 7F*ca* and the pattern 7F*cba* are formed at both end portions in the longitudinal direction of the first flap 3*g*. In the pattern 7F*cba*, the amplitude direction of the meander shape may be formed along a direction in which the side 3*aa* serving as a fold extends, and the meander-shaped pattern may be formed so as to extend toward the side edge 3*ga* of the tip of the first flap 3*g*.

By rotating the extending direction of the meander-shaped pattern 7F*cba* of the second antenna film 7F*cb* being a long antenna pattern by 90 degrees from the extending direction of the pattern 7F*cbb*, when the contents are metal objects such as a press through pack (PTP) sheet, for example, the communication distance can be somewhat increased.

Figure 22:
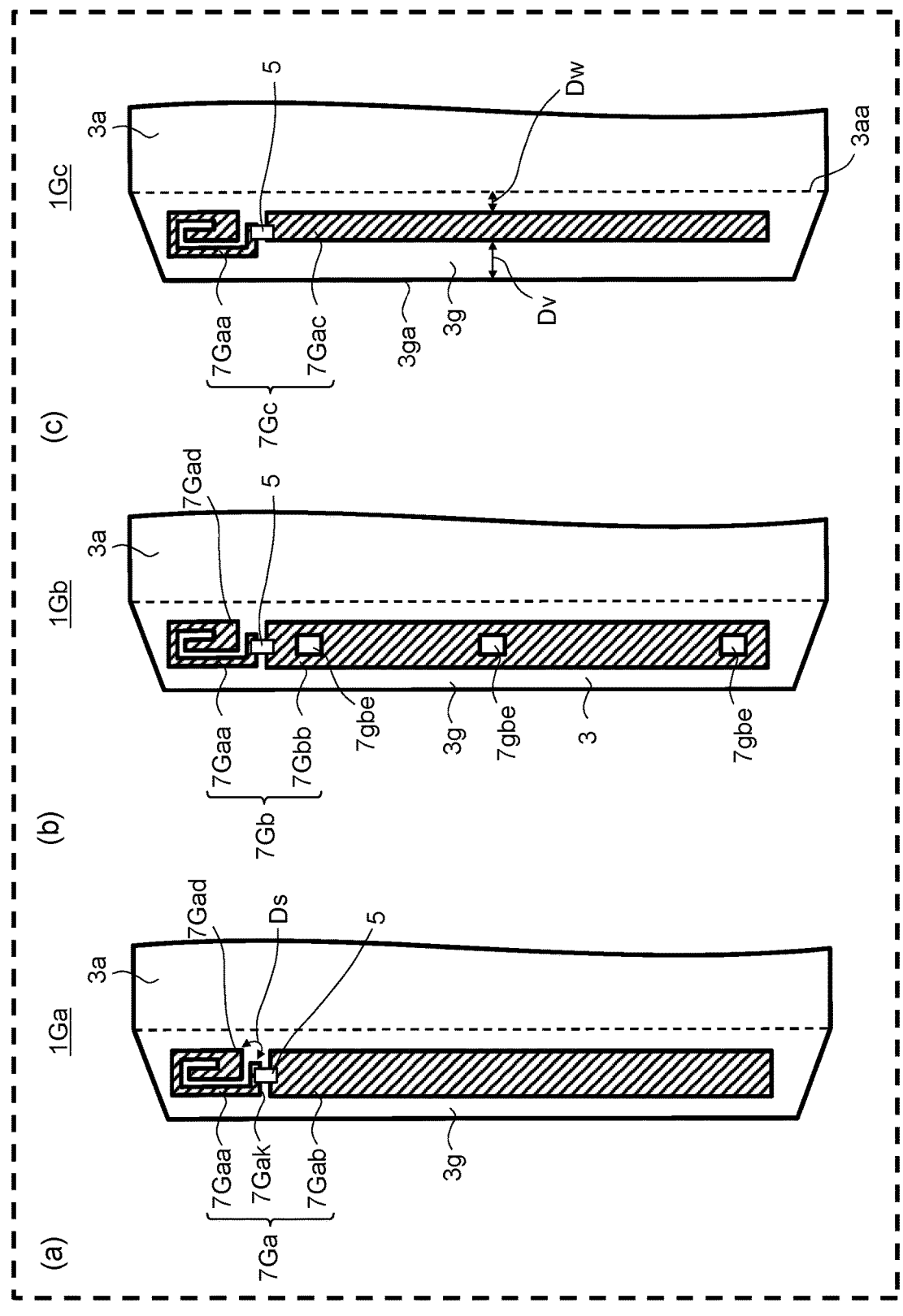
FIG. 22 is a partially enlarged view of a developed view of a container in a modification of the exemplary embodiment.

In addition, the first antenna film 7D*a* of antenna pattern 7E*a* shown in FIG. 19 has a meander shape, but the present invention is not limited thereto. FIG. 22 shows an example in which the first antenna film of the antenna pattern formed on the first flap 3*g* does not have a meander shape. Each of FIGS. 22(*a*), 22(*b*), and 22(*c*) is a partially enlarged views of a developed view of a container in a modification of the embodiment.

As shown in FIG. 22(*a*), the antenna pattern 7G*a* includes a loop-shaped first antenna film 7G*aa* and a second antenna film 7G*ab* longer than the first antenna film 7G*aa*. The second antenna film 7G*ab* has a rectangular shape. One end of the first antenna film 7G*aa* is a land 7G*ak* to which one end of the RFID module 5 is attached, and a pattern is formed from the land 7G*ak* spirally from the outside to the inside.

An electric field is strong in a region Ds between the portion 7G*ad* on the first surface 3*a* side of the first antenna film 7G*aa* facing the land 7G*ak* and the land 7G*ak*. Therefore, the pattern of the loop-shaped first antenna film 7G*aa* is formed to be wound inward, for example, clockwise so that the region Ds does not overlap the contents housed in the container 1G*a*.

In addition, as shown in FIG. 22(*b*), the antenna pattern 7G*b* of the container 1G*b* includes a first antenna film 7G*aa* and a rectangular second antenna film 7G*ab*. One or more holes 7*gbe* are formed in the second antenna film 7G*ab*. Since the base material 3 is exposed in the hole 7*gbe*, the adhesive layer 11 can improve the adhesive force between the first flap 3*g* and the second surface 3*b*.

In addition, as shown in FIG. 22(*c*), the antenna pattern 7G*c* of the container 1G*c* includes a first antenna film 7G*ac* and a rectangular second antenna film 7G*ac*. The second antenna film 7Gac is disposed close to the side 3aa serving as a fold. That is, the distance Dv between the second antenna film 7Gac and the side edge 3ga is longer than the distance Dw between the second antenna film 7Gac and the side 3aa. Accordingly, it is possible to reduce the region where the second antenna film 7Gac overlaps the contents housed in the container 1Gc.

Next, a fifth modification of the exemplary embodiment will be described with reference to FIG. 23. FIG. 23 is a partially enlarged view of a developed view of a container 1H in the fifth modification of the embodiment, FIG. 23(a) is a view showing an antenna pattern formed on the first flap 3g, FIG. 23(b) is a peripheral view of the RFIC 23, and FIG. 23(c) is a view showing an antenna pattern to which the RFIC 23 is attached.

The container 1H in the fifth modification of the embodiment is a modification of the container 1D shown in FIG. 14A, and has a configuration in which an inductor is formed on the antenna pattern side instead of using the RFID module 5, and the RFIC 23 is attached to the antenna pattern that also has a function of an inductor.

As shown in FIG. 23(a), the antenna pattern 7H in the fifth modification of the embodiment is an asymmetric dipole antenna. The antenna pattern 7H includes a first antenna film 7Ha that also functions as an inductor and a second antenna film 7Hb.

The first antenna film 7Ha includes a land 7Haa electrically connected to the other terminal of the RFIC 23, and a loop pattern 7Hab extending in a loop shape from the land 7Haa to the land 7Hbc. The first antenna film 7Ha functions as a matching circuit, performs impedance matching between the first antenna film 7Ha and the RFIC 23, and enables energy transmission between the RFIC 23 and the antenna pattern 7H.

The second antenna film 7Hb includes a land 7Hbc electrically connected to one terminal of the RFIC 23, a pattern 7Hbb linearly extending from the land 7Hbc, and an antenna film 7Hbc having a meander-shaped pattern. The first and second antenna films 7Ha and 7Hb are formed by, for example, foil stamping of vapor deposition foil or printing of a conductive paste.

As shown in FIGS. 23(b) and 23(c), the RFIC 23 is attached to the land 7Haa and the land 7Hbc through the electrodes 63 and 64 respectively connected to the two terminals 23a and 23b of the RFIC 23, and a resin sheet 65 on which the electrodes 63 and 64 are formed. The electrodes 63 and 64 are disposed so as to respectively overlap the lands 7Haa and 7Hbc, and the electrodes 63 and 64 are respectively capacitively coupled to the lands 7Haa and 7Hbc.

According to the container 1H in the fifth modification of the exemplary embodiment, by forming the first antenna film 7Ha that also functions as an inductor on the first flap 3g instead of using the RFID module 5, the antenna pattern 7H and the RFIC 23 are hidden in appearance at the time of box formation, and do not affect the designability of the container 1H.

Figure 24B:
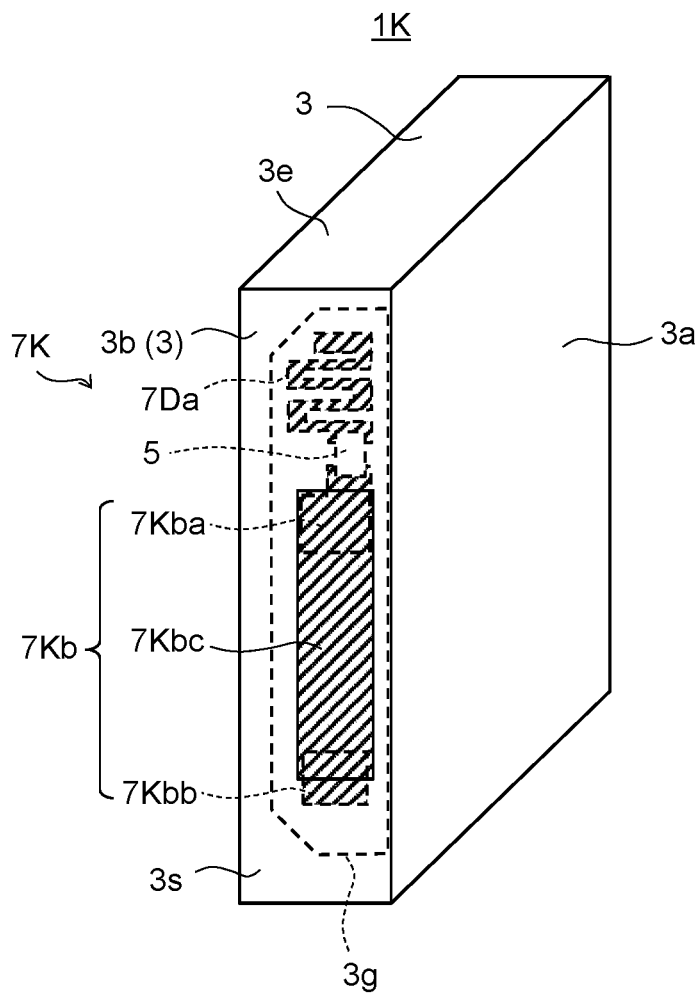
FIG. 24B is a perspective view of a container in a modification of the exemplary embodiment.

Next, a sixth modification of the exemplary embodiment will be described with reference to FIGS. 24A and 24B. FIG. 24A is a developed view of a container 1K in the sixth modification of the embodiment, FIG. 24B is a view showing an antenna pattern formed on the first flap 3g, FIG. 23(b) is a peripheral view of the RFIC 23, and FIG. 23(c) is a view showing an antenna pattern to which the RFIC 23 is attached.

The container 1K in the fifth modification of the exemplary embodiment is a modification of the container 1D shown in FIG. 14A, and has a configuration in which the second antenna film 7Kb is divided into a plurality of electrodes, and the container 1K functions as one antenna pattern in an assembled state.

The antenna pattern 7K includes a first antenna film 7Da and a second antenna film 7Kb. The second antenna film 7Kb includes a first pattern electrode 7Kba and a second pattern electrode 7Kbb arranged on the first main surface 3s side of the first flap 3g, and a third pattern electrode 7Kbc arranged on the first main surface 3s side of the second surface 3b. Each of the first pattern electrode 7Kba to the third pattern electrode 7Kbc is formed by, for example, foil stamping of vapor deposition foil or printing of a conductive paste.

Figure 24C:
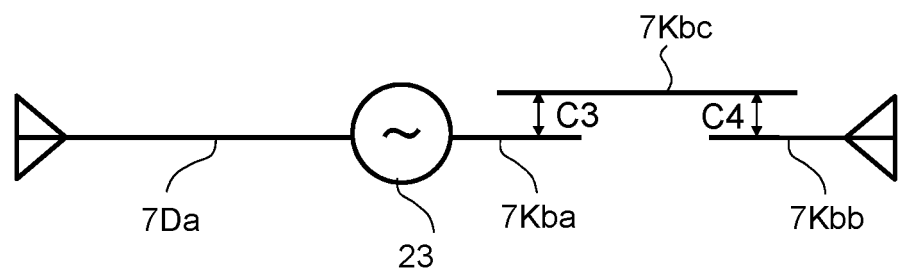
FIG. 24C is an antenna circuit diagram in a modification of the exemplary embodiment.

When the container 1K is assembled, as shown in FIGS. 24B and 24C, the second surface 3b is disposed between the first pattern electrode 7Kba and second pattern electrode 7Kbb and the third pattern electrode 7Kbc. A capacitor C3 is generated between the first pattern electrode 7Kba and the third pattern electrode 7Kbc, a capacitor C4 is generated between the second pattern electrode 7Kbb and the third pattern electrode 7Kbc, and each is capacitively coupled. Accordingly, the first pattern electrode 7Kba to the third pattern electrode 7Kbc function as one antenna pattern.

Figure 24D:
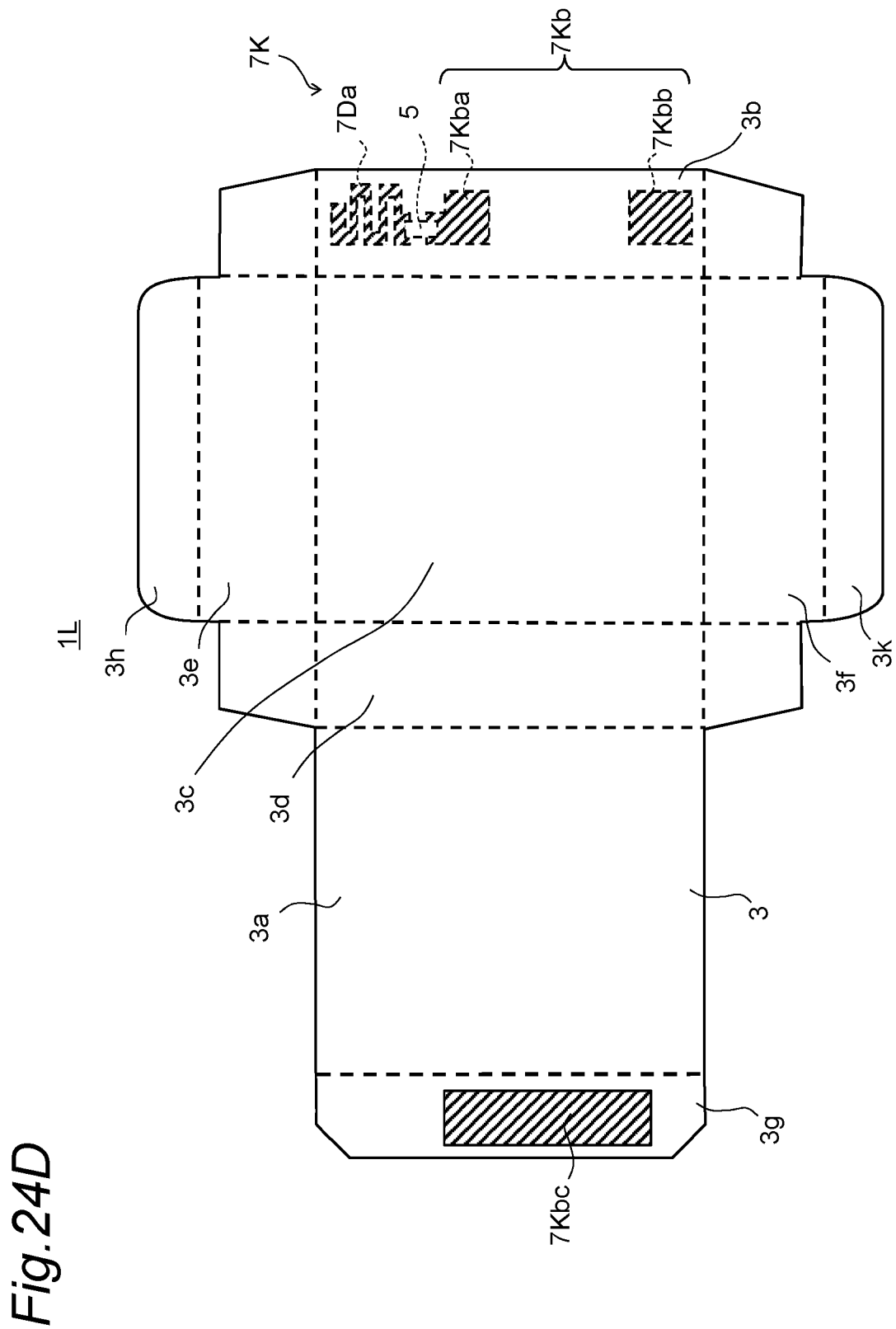
FIG. 24D is a developed view of a container in a modification of the exemplary embodiment.

In addition, as shown in FIG. 24D, the first antenna film 7Da, the first pattern electrode 7Kba and the second pattern electrode 7Kbb of the second antenna film 7Kb, and the RFID module 5 may be disposed on the back (e.g., the second main surface 3t) side of the second surface 3b, and the third pattern electrode 7Kbc may be disposed on the front (e.g., the first main surface 3s) side of the first flap 3g. Even with this configuration, when the container 1L is assembled, the first pattern electrode 7Kba to the third pattern electrode 7Kbc can function as one antenna pattern. In addition, the first pattern electrode 7Kba to the third pattern electrode 7Kbc may be disposed on any of the front surface and the back surface of the base material 3.

In general, it should be appreciated that the exemplary aspects of the present invention are not limited to each of the embodiments described above, and can be modified and implemented as follows.

In each of the above embodiments, the container 1 is assembled, but the present implementation is not limited thereto. The container 1 may be a bottle or a PET bottle in alternative aspects.

In each embodiment described above, the antenna pattern 7 is a part of the pattern formed on the container 1, but the present implementation is not limited thereto. A printed film may be further applied to the container 1 on which the antenna pattern 7 is formed and a design different from that of the antenna pattern 7 may be applied.

In each of the above embodiments, the communication frequency band is the UHF band, but the present implementation is not limited thereto. Wireless communication may be performed with a high frequency signal having a communication frequency (e.g., carrier frequency) in the HF band. It should be noted that the HF band is a frequency band of 13 MHz or more and 15 MHz or less.

In each embodiment described above, the antenna pattern 7 may be formed on the second main surface 3t of the base material 3 instead of the first main surface 3S. That is, the antenna pattern 7 may be formed inside the container 1 in an exemplary aspect.

REFERENCE NUMERALS 1 container
3 base material 3a first surface
3aa side
3b second surface
3c third surface
3ca first region
3cb second region
3cc third region
3cd fourth region
3d fourth surface
3e fifth surface
3f sixth surface
3g first flap
3ga side edge
3h second flap
3k third flap
3s first main surface
3t second main surface
3u tapered portion
3v recessed portion
5 RFID module
5a front surface
5b back surface
7, 7D antenna pattern
7a, 7Da first antenna film
7b, 7Db second antenna film
9 gap
15 adhesive
21 substrate
23 RFIC
23a terminal
23b terminal
25 protective film
27 protection film
29 first electrode
31 second electrode
33 third electrode
35 fourth electrode
41 pouch
43 pattern
51 container
51a container main body
51b lid
L1 first inductance element
L1a conductor pattern
L2a conductor pattern
L2 second inductance element
L2a conductor pattern
L2b conductor pattern
L3 third inductance element
L3a conductor pattern
L3b conductor pattern
L3c conductor pattern
L4 fourth inductance element
L5 fifth inductance element
CP1 first current path
CP2 second current path
Cr1 first coil
Cr2 second coil
C1, C2, C3, C4 capacitor
Sp space

The invention claimed is:

1. A container including an RFID device, the container comprising:
    a base having an insulating property and configured to form an outer shape of the container; and
    an antenna pattern including a first antenna film including a first length and a first pattern and a second antenna film including a second length and a second pattern on a first main surface of the base,
    wherein the RFID device includes:
        an RFIC element,
        a filter configured to transmit a current due to an electromagnetic wave at a natural resonance frequency being a communication frequency to the RFIC element,
        a first electrode electrically connected to the first antenna film, and
        a second electrode electrically connected to the second antenna film,
        wherein a sheet resistance of each of the first antenna film and the second antenna film is 0.5Ω/sq or more;
    wherein the second length and the first length are different or the first pattern and the second pattern are different.

2. The container including the RFID device according to claim 1, wherein the filter is an LC parallel resonance circuit.

3. The container including the RFID device according to claim 2, wherein the filter includes a coil on a substrate and that is covered with a protective layer.

4. The container including the RFID device according to claim 3, wherein the coil of the filter has a figure-eight shape.

5. The container including the RFID device according to claim 1, wherein a thickness of each of the first antenna film and the second antenna film is 0.1 μm or more and 3 μm or less.

6. The container including the RFID device according to claim 1, further comprising a pattern on the base and that includes the antenna pattern.

7. The container including the RFID device according to claim 1, further comprising a printed film on the antenna pattern.

8. The container including the RFID device according to claim 1, wherein the container including the RFID device is an assembled box.

9. The container including the RFID device according to claim 8, wherein the base has a first surface and a second surface each of which has a first main surface serving as a side surface of the box, and a flap continuous with the first surface for connecting the first surface and the second surface.

10. The container including the RFID device according to claim 9, wherein the antenna pattern is on the flap, and the RFID device is on the flap.

11. The container including the RFID device according to claim 1, wherein the container is configured to house a metal article or an article containing moisture.

12. The container including the RFID device according to claim 10,
    wherein the container is configured to house a metal article or an article containing moisture, such that a space is above the metal article or the article containing moisture in the container, and
    wherein in a side view, the first antenna film overlaps the space, and the second antenna film overlap the metal article or the article containing moisture.

13. A container including an RFID device, the container comprising:
    a base having an insulating property and configured to form an outer shape of the container; and
    an antenna pattern including a first antenna film including a first length and a first pattern and a second antenna film including a second length and a second pattern on a first main surface of the base,
    wherein the RFID device includes:

an RFIC element, a filter, a first electrode electrically connected to the first antenna film, and a second electrode electrically connected to the second antenna film, wherein a sheet resistance of each of the first antenna film and the second antenna film is 0.5Ω/sq or more;

wherein the second length and the first length are different or the first pattern and the second pattern are different.

14. The container including the RFID device according to claim 13, wherein the filter is configured to transmit a current due to an electromagnetic wave at a natural resonance frequency being a communication frequency to the RFIC element.

15. The container including the RFID device according to claim 13, wherein the base has a first surface and a second surface each of which has a first main surface serving as a side surface of an assembled box, and a flap continuous with the first surface for connecting the first surface and the second surface, and wherein the antenna pattern is on the flap, and the RFID device is on the flap.

16. The container including the RFID device according to claim 15, wherein the container is configured to house a metal article or an article containing moisture, such that a space is above the metal article or the article containing moisture in the container, and wherein in a side view, the first antenna film overlaps the space, and the second antenna film overlap the metal article or the article containing moisture.

17. A method for manufacturing a container including an RFID device, the method comprising:

printing an antenna pattern including a first antenna film including a first length and a first pattern and a second antenna film including a second length and a second pattern on a first main surface of a base having an insulating property and that forms an outer shape of the container; and mounting the RFID device that includes an RFIC element, a filter configured to transmit a current due to an electromagnetic wave to the RFIC element, and first and second electrodes to be connected to the filter on the first antenna film and the second antenna film so as to electrically connect the first electrode and the first antenna film and to electrically connect the second electrode and the second antenna film, wherein a sheet resistance of each of the first antenna film and the second antenna film is 0.5Ω/sq or more;

wherein the second length and the first length are different or the first pattern and the second pattern are different.

18. The method for manufacturing the container including the RFID device according to claim 17, further comprising printing a pattern on the first main surface of the base.

19. The method for manufacturing the container including the RFID device according to claim 18, further comprising printing, on the first main surface of the base, the antenna pattern and the pattern in a same printing step.

20. The method for manufacturing the container including the RFID device according to claim 17, further comprising printing the antenna pattern on the first main surface by gravure printing or offset printing.

* * * * *